(12) United States Patent
Astle et al.

(10) Patent No.: US 11,712,645 B2
(45) Date of Patent: *Aug. 1, 2023

(54) FILTER INTERCONNECT UTILIZING CORRELATED MAGNETIC ACTUATION FOR DOWNSTREAM SYSTEM FUNCTION

(71) Applicant: KX Technologies, LLC, West Haven, CT (US)

(72) Inventors: Robert Astle, Middlefield, CT (US); William Li, Pittsburgh, PA (US); Garett Strandemo, Evansville, IN (US); Matthew W. Hartmann, Evansville, IN (US)

(73) Assignee: KX Technologies LLC, West Haven, CT (US)

(*) Notice: Subject to any disclaimer, the term of this patent is extended or adjusted under 35 U.S.C. 154(b) by 410 days.

This patent is subject to a terminal disclaimer.

(21) Appl. No.: 16/876,766

(22) Filed: May 18, 2020

(65) Prior Publication Data

US 2020/0360931 A1 Nov. 19, 2020

Related U.S. Application Data

(60) Provisional application No. 63/023,600, filed on May 12, 2020, provisional application No. 62/849,525, filed on May 17, 2019.

(51) Int. Cl.
*B01D 29/96* (2006.01)
*H01H 3/50* (2006.01)
(Continued)

(52) U.S. Cl.
CPC ............. *B01D 29/96* (2013.01); *B01D 29/31* (2013.01); *B01D 35/306* (2013.01);
(Continued)

(58) Field of Classification Search
CPC ............. B01D 35/306; B01D 2201/30; B01D 2201/4069; H01F 7/0242; H01H 36/0073
(Continued)

(56) References Cited

U.S. PATENT DOCUMENTS

| 3,420,266 A | 1/1969 | Downey |
| 3,521,216 A | 7/1970 | Tolegian |

(Continued)

FOREIGN PATENT DOCUMENTS

| CN | 204099679 | 1/2015 |
| EP | 2438601 | 3/2017 |

OTHER PUBLICATIONS http://www.polymagnet.com/media/Polymagnet-White-Paper-3-Smart-Magnets-for-Precision-Alignment.

*Primary Examiner* — Claire A Norris
(74) *Attorney, Agent, or Firm* — DeLio Peterson & Curcio LLC; David R. Pegnataro

(57) ABSTRACT

A filtration system interconnection structure having a filter manifold including a sump housing and a first correlated magnet located on or connected to a portion of the manifold, and a filter cartridge including a filter media, first and second end caps sealed to the filter media, and a second, paired correlated magnet located on or connected to the filter cartridge housing body. The first and second correlated magnets are interconnected via magnetic communication upon insertion of the filter cartridge into the sump housing, and upon movement of the filter cartridge into an alignment position, the correlated magnet located on or connected to the manifold is permitted to translate as a result of the magnetic communication. The polarity profiles of the paired correlated magnets are aligned such that a repulsion force is created when the filter cartridge is inserted within the manifold sump housing.

28 Claims, 24 Drawing Sheets

(51) Int. Cl.
  *B01D 29/31*   (2006.01)
  *B01D 35/30*   (2006.01)
  *H01H 36/00*   (2006.01)

(52) U.S. Cl.
  CPC ........ *H01H 3/503* (2013.01); *H01H 36/0073* (2013.01); *B01D 2201/16* (2013.01); *B01D 2201/291* (2013.01); *B01D 2201/301* (2013.01); *B01D 2201/303* (2013.01); *B01D 2201/4023* (2013.01); *B01D 2201/4053* (2013.01); *B01D 2201/4069* (2013.01); *B01D 2201/4092* (2013.01); *H01H 2036/0093* (2013.01)

(58) Field of Classification Search
  USPC .............. 210/354, DIG. 17; 335/306; 251/65
  See application file for complete search history.

(56) References Cited

U.S. PATENT DOCUMENTS

| | | | |
|---|---|---|---|
| 4,468,321 A | 8/1984 | St. John | |
| 5,527,450 A | 6/1996 | Burrows | |
| 6,003,734 A | 12/1999 | Oh | |
| 7,800,471 B2 | 9/2010 | Fullerton et al. | |
| 7,800,473 B2 | 9/2010 | Fullerton et al. | |
| 7,808,348 B2 | 10/2010 | Fullerton et al. | |
| 7,808,349 B2 | 10/2010 | Fullerton et al. | |
| 7,808,350 B2 | 10/2010 | Fullerton et al. | |
| 7,817,006 B2 | 10/2010 | Fullerton et al. | |
| 7,893,803 B2 | 2/2011 | Fullerton et al. | |
| 8,098,122 B2 | 1/2012 | Fullerton et al. | |
| 8,279,032 B1 | 10/2012 | Fullerton et al. | |
| 8,314,671 B2 | 11/2012 | Fullerton et al. | |
| 8,314,672 B2 | 11/2012 | Fullerton et al. | |
| 8,461,952 B1 | 6/2013 | Fullerton et al. | |
| 8,570,129 B2 | 10/2013 | Fullerton | |
| 8,760,252 B2 | 6/2014 | Fullerton et al. | |
| 8,872,608 B2 | 10/2014 | Fullerton et al. | |
| 8,963,668 B2 | 2/2015 | Fullerton et al. | |
| 9,233,322 B1 * | 1/2016 | Huda | B01D 35/14 |
| 10,129,667 B2 | 11/2018 | Gustafsson | |
| 10,173,292 B2 | 1/2019 | Fullerton et al. | |
| 2003/0042191 A1 | 6/2003 | Nam et al. | |
| 2008/0179236 A1 | 7/2008 | Wieczorek et al. | |
| 2009/0289749 A1 | 11/2009 | Fullerton et al. | |
| 2010/0140521 A1 | 6/2010 | Burgess et al. | |
| 2010/0212259 A1 | 8/2010 | Knieling et al. | |
| 2010/0264078 A1 | 10/2010 | Bassett | |
| 2011/0114862 A1 | 5/2011 | Zimmerman et al. | |
| 2012/0229241 A1 | 9/2012 | Fullerton et al. | |
| 2013/0068673 A1 | 3/2013 | Maggiore et al. | |
| 2013/0240431 A1 | 9/2013 | Foix et al. | |
| 2016/0194229 A1 | 7/2016 | Mehdi | |
| 2017/0072347 A1 | 3/2017 | Schmoll | |
| 2017/0259196 A1 | 9/2017 | Foix et al. | |
| 2018/0111129 A1 | 4/2018 | Adey et al. | |
| 2018/0221795 A1 | 8/2018 | Bonitas et al. | |
| 2018/0245429 A1 | 8/2018 | Bhadbjade | |
| 2019/0039005 A1 | 2/2019 | Suthar et al. | |
| 2019/0351352 A1 | 11/2019 | Chandra et al. | |
| 2019/0351354 A1 * | 11/2019 | Chandra | B01D 29/15 |
| 2020/0001211 A1 | 1/2020 | Li | |
| 2020/0360844 A1 * | 11/2020 | Astle | H01H 3/503 |

\* cited by examiner

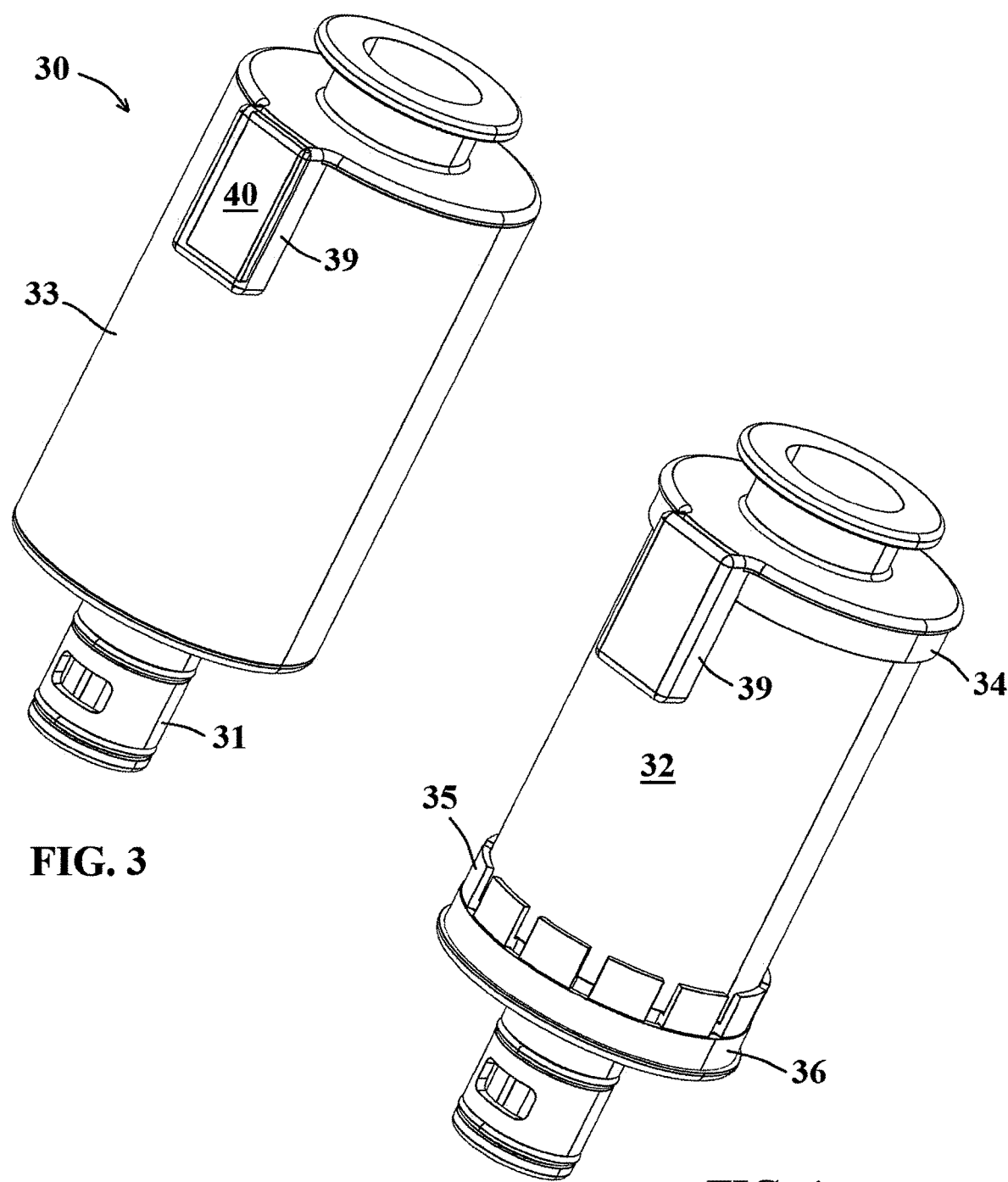

FILTER INTERCONNECT UTILIZING CORRELATED MAGNETIC ACTUATION FOR DOWNSTREAM SYSTEM FUNCTION

BACKGROUND OF THE INVENTION

1. Field of the Invention

The present invention relates to the interconnection scheme between a filter cartridge and its corresponding manifold. The invention utilizes a correlated magnetism design that encompasses correlated magnets, and more specifically a magnetic attraction, repulsion, or combination thereof to generate shear force, is introduced upon filter cartridge insertion into a mating manifold to aid in interconnection. In exemplary aspects, the interconnection scheme utilizes magnetic repulsion to aid in filter cartridge installation and/or removal. The function of the correlated magnetism in the present invention is at least two-fold: first, an upstream valve is actuated during initial installation of a filter cartridge into a mating manifold through non-electronic and non-contact actuation of a switch, and second, a magnetic repulsion force is introduced upon rotation to assist in filter cartridge removal from the manifold.

2. Description of Related Art

Correlated magnet designs were introduced in U.S. Pat. No. 7,800,471 issued to Cedar Ridge Research LLC on Sep. 21, 2010, entitled "FIELD EMISSION SYSTEM AND METHOD." This patent describes field emission structures having electric or magnetic field sources. The magnitudes, polarities, and positions of the magnetic or electric field sources are configured to have desirable correlation properties, which are in accordance with a predetermined code. The correlation properties correspond to a special force function where spatial forces correspond to relative alignment, separation distance, and a spatial force function.

In U.S. Pat. No. 7,817,006, issued to Cedar Ridge Research LLC on Oct. 19, 2010, titled "APPARATUS AND METHODS RELATING TO PRECISION ATTACHMENTS BETWEEN FIRST AND SECOND COMPONENTS (a related patent to U.S. Pat. No. 7,800,471), an attachment scheme between first and second components is taught. Generally, a first component includes a first field emission structure and the second component includes a second field emission structure, wherein each field emission structure includes multiple magnetic field emission sources (magnetic array) having positions and polarities relating to a predefined spatial force function that corresponds to a predetermined alignment of the field emission structures. The components are adapted to be attached to each other when the first field emission structure is in proximity of the second field emission structure.

When correlated magnets are brought into alignment with complementary or mirror image counterparts, the various magnetic field emission sources that make up each correlated magnet will align causing a peak spatial attraction or repulsion force, while a misalignment will cause the various magnetic field emission sources to substantially cancel each other out. The spatial forces (attraction, repulsion) have a magnitude that is a function of the relative alignment of two magnetic field emission structures, the magnetic field strengths, and their various polarities.

It is possible for the field emissions sources of correlated magnets to be varied in accordance with a "code", such that magnetic systems can be made to have a desired behavior without mechanical constraint, or without requiring a holding mechanism to prevent magnetic forces from "flipping" a magnet. As an illustrative example of this magnetic action, an apparatus 1000 of the prior art is depicted in FIG. 1. Apparatus 1000 includes a first component 1002 and a second component 1012. The first component includes a first field emission structure 1004 comprising multiple field emission sources 1006. The second component includes a second field emission structure 1014 comprising multiple field emission sources 1016. The first and second components are adapted to attach to one another when the first field emission structure 1004 is in proximity of the second field emission structure 1014, that is, they are in a predetermined alignment with respect to one another.

The first field emission structure 1004 may be configured to interact with the second field emission structure 1014 such that the second component 1012 can be aligned to become attached (attracted) to the first component 1002 or misaligned to become removed (repulsed) from the first component. The first component 1002 can be released from the second component 1012 when their respective first and second field emission structures 1004 and 1014 are moved with respect to one another to become misaligned.

Generally, the precision within which two or more field emission structures tend to align increases as the number N of different field emission sources in each field emission structure increases, including for a given surface area A. In other words, alignment precision may be increased by increasing the number N of field emission sources forming two field emission structures. More specifically, alignment precision may be increased by increasing the number N of field emission sources included within a given surface area A.

In U.S. Pat. No. 7,893,803 issued to Cedar Ridge Research LLC on Feb. 22, 2011, titled "CORRELATED MAGNETIC COUPLING DEVICE AND METHOD FOR USING THE CORRELATED COUPLING DEVICE," a compressed gas system component coupling device is taught that uses the correlated magnet attachment scheme discussed above.

An illustrative example of this coupling device is shown in FIG. 2, which depicts a quick connect air hose coupling 1200 having a female element 1202 and a male element 1204.

The female element 1202 includes a first magnetic field emission structure 1218. The male element 1204 includes a second magnetic field emission structure 1222. Both magnetic field emission structures are generally planar and are in accordance with the same code but are a mirror image of one another. The operable coupling and sealing of the connector components 1202, 1204 is accomplished with sufficient force to facilitate a substantially airtight seal therebetween.

The removal or separation of the male element 1204 from the female element 1202 is accomplished by separating the attached first and second field emission structures 1218 and 1222. The male element is released when the male element is rotated with respect to the female element, which in turn misaligns the first and second magnetic field emission structures.

A description of the precision alignments of polymagnets can be found at:
http://www.polymagnet.com/media/Polymagnet-White-Paper-3-Smart-Magnets-for-Precision-Alignment.pdf.

Prior art filter interconnects present numerous technical hurdles, particularly with respect to downstream electronic functionality. Such technical hurdles include preventing fluid from leaking into or reaching the electronic components of the filter housing either during initial filter cartridge installation or during operation.

Therefore, a need exists for an improved filter interconnect which overcomes these technical hurdles, without substantially increasing the cost and complexity of manufacture.

The present invention adapts the correlated magnet technology described above to an interconnection structure for a filter cartridge and a corresponding manifold to resolve many of the technical hurdles of prior art filter interconnects with downstream electronic functionality.

As described herein, the correlated magnet technology has a variety of implementations in filter interconnect structures, including, for example, in actuation of valves or switches, as well as in improved filter authentication and anti-counterfeiting measures.

SUMMARY OF THE INVENTION

Bearing in mind the problems and deficiencies of the prior art, it is therefore an object of the present invention to provide an improved filter interconnect structure for a filter cartridge and a corresponding filter manifold which utilizes correlated magnetism.

It is another object of the present invention to provide an improved filter interconnect which utilizes correlated magnetism to provide the initial drive to engage downstream system functionality.

A further object of the invention is to provide an improved filter interconnect and method of installing a filter cartridge in a corresponding filter manifold which allows for non-electronic and non-contacting actuation of downstream electronic system components.

It is yet another object of the present invention to provide an improved filter interconnect which prevents leaking by dissociating the initial filter cartridge installation from the actuation of an upstream and/or downstream valve.

Yet another object of the present invention is to provide an improved filter interconnect which utilizes correlated magnetism to provide an effective authentication and/or anti-counterfeiting means for ensuring proper filter cartridge installation.

Still other objects and advantages of the invention will in part be obvious and will in part be apparent from the specification.

The above and other objects, which will be apparent to those skilled in the art, are achieved in the present invention which is directed in one aspect to a filtration system comprising a filter manifold including a sump, an electronic switch assembly comprising a circuit actuable between open and closed positions, the switch assembly radially disposed with respect to the sump, and a first correlated magnet operably coupled to the switch assembly. The first correlated magnet comprises a plurality of magnetic field emission sources having positions and polarities relating to a predefined spatial force function that corresponds to a predetermined alignment of the plurality of magnetic field emission sources. The filtration system further comprises a filter cartridge including a filter media, first and second end caps sealed to the filter media, a body disposed between the first and second end caps, and a complementary or paired second correlated magnet radially disposed on one of the first or second end caps proximate an outside surface of the filter cartridge body. In an embodiment, one of the filter cartridge first or second end caps includes an axially-extending portion integral with or connected thereto and proximate the outside surface of the filter cartridge body, and the second correlated magnet is disposed within the axially-extending portion.

The first and second correlated polymagnets are interconnected via magnetic communication upon insertion of the filter cartridge into the sump housing, and upon movement of the filter cartridge into an alignment position, the first correlated magnet translates transversely with respect to a longitudinal axis of the sump as a result of the magnetic communication to contact an actuator to activate the switch. In at least one embodiment, the manifold further includes a valve, wherein activation of the switch actuates the valve to turn on and turn off fluid flow to the filter cartridge.

In an embodiment, the first correlated magnet plurality of magnetic field emission sources are aligned with a plurality of magnetic field emission sources of the second correlated magnet, such that a repulsion force is generated between the magnets when the filter cartridge is inserted within the sump and rotated to the alignment position.

The sump may include an alignment thread or channel for mechanically coupling with a filter boss or lug extending radially outwards from one of the first or second end caps when the filter cartridge is inserted within the sump and rotated to the alignment position. In an embodiment, the filter cartridge rotates approximately 90-degrees in a first direction from an initial insertion position within the sump to the alignment position.

The filtration system may further include a radially-extending locking plate including an aperture for permitting insertion of the filter cartridge into the sump, the locking plate including an alignment thread or channel for mechanically coupling with a boss or lug of a removable locking cover when the filter cartridge is inserted within the sump. The locking cover is rotatable about the longitudinal axis of the sump to translate the filter cartridge axially into the alignment position.

In an embodiment, the first correlated magnet is disposed within a translatable magnet housing of the switch assembly, the magnet housing normally biased towards the longitudinal axis of the sump by a spring and slidable linearly as a result of the magnetic communication in a direction normal to the longitudinal axis of the sump to contact the actuator to activate the switch upon movement of the filter cartridge into an alignment position.

In another aspect, the present invention is directed to a filter cartridge comprising a filter media, first and second end caps sealed to the filter media, a body disposed between the first and second end caps, and a first correlated magnet radially disposed on one of the first or second end caps proximate an outside surface of the filter cartridge body. One of the first or second end caps may include an axially-extending portion integral with or connected thereto and proximate the outside surface of the body, and the first correlated magnet may be disposed within the axially-extending portion. The first correlated magnet comprises a plurality of magnetic field emission sources having positions and polarities relating to a predefined spatial force function that corresponds to a predetermined alignment of the plurality of magnetic field emission sources. The first correlated magnet is adapted to be in close proximity to a complementary or paired second correlated magnet when the filter cartridge is inserted within a sump of a filter manifold and moved into an alignment position.

The filter cartridge body may further include a sheath or sleeve covering the filter media and disposed between the first and second end caps. In an embodiment, the filter cartridge may further include a filter boss or lug extending radially outwards from one of the first or second end caps, the filter boss or lug adapted for mechanically coupling with an alignment thread or channel of the sump housing as the filter cartridge is rotated to the alignment position.

In still another aspect, the present invention is directed to a method of interconnecting a filter cartridge and filter manifold, comprising: inserting the filter cartridge comprising a correlated magnet radially disposed on one of the first or second end caps proximate an outside surface of the filter cartridge body as described above into a sump of the filter manifold; moving the filter cartridge within the sump into an alignment position; aligning the first correlated magnet plurality of magnetic field emission sources with a plurality of magnetic field emission sources of a complementary or paired second correlated magnet such that a repulsion force is generated between the magnets, the second correlated magnet operably coupled to a switch assembly radially disposed with respect to the sump; and causing the second correlated magnet to translate transversely with respect to a longitudinal axis of the sump as a result of magnetic repulsion to contact an actuator to activate the switch.

The sump may include an alignment thread or channel for mechanically coupling with a filter boss or lug extending radially outwards from one of the first or second end caps, and the method may further comprise the steps of: aligning the filter boss or lug with the alignment thread or channel while inserting the filter cartridge within the sump, and causing the filter boss or lug to travel to an end of the alignment thread or channel while rotating the filter cartridge to the alignment position.

In an embodiment, the filter manifold may further include a radially-extending locking plate including an aperture for permitting insertion of the filter cartridge into the sump, the locking plate including an alignment thread or channel for mechanically coupling with a boss or lug of a removable locking cover when the filter cartridge is inserted within the sump, the locking cover rotatable about the longitudinal axis of the sump to translate the filter cartridge axially into the alignment position, and the method may further include the steps of: aligning the locking cover boss or lug with the locking plate alignment thread or channel while inserting the filter cartridge within the sump; and rotating the locking cover to cause the boss or lug to travel to an end of the alignment thread or channel to move filter cartridge to the alignment position.

In another aspect, the present invention is directed to a filtration system comprising a filter manifold including a sump, an electronic switch assembly comprising a circuit actuable between open and closed positions, the switch assembly axially disposed with respect to the sump, and a first correlated magnet operably coupled to the switch assembly, the first correlated magnet comprising a plurality of magnetic field emission sources having positions and polarities relating to a predefined spatial force function that corresponds to a predetermined alignment of the plurality of magnetic field emission sources. The filtration system further comprises a filter cartridge including a housing having a body, a filter media disposed with the housing body, a filter head forming a fluid-tight seal with the body, and a complementary or paired second correlated magnet disposed within or connected to the filter head and having a face oriented parallel to a top surface thereof, the second correlated magnet rotatable with the filter cartridge. In an embodiment, the filter cartridge further includes an axial stem and the second correlated magnet is disposed within the axial stem, parallel to the top surface of the filter head. The first and second correlated polymagnets are interconnected via magnetic communication upon insertion of the filter cartridge into the sump housing, and upon rotation of the filter cartridge into an alignment position, the first correlated magnet translates axially with respect to a longitudinal axis of the sump as a result of the magnetic communication to contact an actuator to activate the switch. In at least one embodiment, the manifold further includes a valve, wherein activation of the switch actuates the valve to turn on and turn off fluid flow to the filter cartridge.

In an embodiment, the first correlated magnet plurality of magnetic field emission sources are aligned with a plurality of magnetic field emission sources of the second correlated magnet, such that a repulsion force is generated between the magnets when the filter cartridge is inserted within the sump and rotated to the alignment position.

The sump may further include an alignment thread or channel for mechanically coupling with a filter boss or lug extending radially outwards from the filter cartridge housing body when the filter cartridge is inserted within the sump and rotated to the alignment position. In an embodiment, the filter cartridge rotates approximately 90-degrees in a first direction from an initial insertion position within the sump to the alignment position.

In an embodiment, the first correlated magnet is disposed within a translatable magnet holder of the switch assembly, the magnet holder normally biased towards the filter head by a spring and slidable axially along the longitudinal axis of the sump as a result of the magnetic communication to contact the actuator to activate the switch upon rotation of the filter cartridge into an alignment position.

In another aspect, the present invention is directed to a filtration system comprising a filter manifold including a sump, an electronic switch assembly comprising a circuit actuable between open and closed positions, the switch assembly axially disposed with respect to the sump, and a first correlated magnet operably coupled to the switch assembly, the first correlated magnet comprising a plurality of magnetic field emission sources having positions and polarities relating to a predefined spatial force function that corresponds to a predetermined alignment of the plurality of magnetic field emission sources. The filtration system further comprises a filter cartridge including a housing having a body, a filter media disposed with the housing body, a filter head forming a fluid-tight seal with the body, and a complementary or paired second correlated magnet disposed within or connected to the filter head and having a face oriented parallel to a top surface thereof. The first correlated magnet plurality of magnetic field emission sources are aligned with a plurality of magnetic field emission sources of the second correlated magnet such that a repulsion force is generated between the magnets when the filter cartridge is inserted within the sump and translated axially to an alignment position, and upon axial movement of the filter cartridge into the alignment position, the first correlated magnet translates axially with respect to a longitudinal axis of the sump as a result of the magnetic repulsion to contact an actuator to activate the switch.

In an embodiment, the first and second correlated magnet plurality of magnetic field emission sources are arranged concentrically.

In yet another aspect, the present invention is directed to a filter cartridge comprising a housing having a body, a filter media disposed within the housing body, a filter head forming a fluid-tight seal with the body, and a first correlated magnet disposed within or connected to the filter head and having a face oriented parallel to a top surface thereof. In an embodiment, the filter cartridge further includes an axial stem and the first correlated magnet is disposed in the axial stem, parallel to the top surface of the filter head. The first correlated magnet comprises a plurality of magnetic field emission sources having positions and polarities relating to a predefined spatial force function that corresponds to a predetermined alignment of the plurality of magnetic field emission sources. The first correlated magnet is adapted to be in close proximity to a complementary or paired second correlated magnet when the filter cartridge is inserted within a sump of a filter manifold and rotated into an alignment position.

The filter cartridge may further include a filter boss or lug extending radially from the housing body, the filter boss or lug adapted for mechanically coupling with an alignment thread or channel of the sump.

In still another aspect, the present invention is directed to a method of interconnecting a filter cartridge and filter manifold, comprising: inserting a filter cartridge comprising a correlated magnet disposed within or connected to the filter head and having a face oriented parallel to a top surface thereof, as described above, into a sump of the filter manifold; rotating the filter cartridge within the sump into an alignment position; aligning the first correlated magnet plurality of magnetic field emission sources with a plurality of magnetic field emission sources of a complementary or paired second correlated magnet such that a repulsion force is generated between the magnets, the second correlated magnet operably coupled to a switch assembly axially disposed with respect to the sump; and causing the second correlated magnet to translate axially with respect to a longitudinal axis of the sump as a result of magnetic repulsion to contact an actuator to activate the switch.

The sump may further include an alignment thread or channel for mechanically coupling with a filter boss or lug extending radially outwards from the filter cartridge housing body, and the method may further comprise the steps of: aligning the filter boss or lug with the alignment thread or channel while inserting the filter cartridge within the sump; and causing the filter boss or lug to travel to an end of the alignment thread or channel while rotating the filter cartridge to the alignment position.

In still yet another aspect, the present invention is directed to a filtration system comprising a filter manifold including a sump, an electronic switch assembly comprising a circuit actuable between open and closed positions, the switch assembly radially disposed with respect to the sump, and a first correlated magnet operably coupled to the switch assembly, the first correlated magnet comprising a plurality of magnetic field emission sources having positions and polarities relating to a predefined spatial force function that corresponds to a predetermined alignment of the plurality of magnetic field emission sources. The filtration system further comprises a filter cartridge including a housing having a body and a top portion forming a fluid-tight seal with the body, the top portion including ingress and egress fluid ports and an axially-extending protrusion integral with or connected to the housing top portion, a filter media disposed with the housing body, and a complementary or paired second correlated magnet disposed within or connected to the housing top portion axially-extending protrusion and having a face oriented parallel to a longitudinal axis of the housing body. The first and second correlated polymagnets are interconnected via magnetic communication upon axial insertion of the filter cartridge into an alignment position within the sump, and upon movement of the filter cartridge into the alignment position, the first correlated magnet translates in a direction normal to a longitudinal axis of the sump as a result of the magnetic communication to contact an actuator to activate the switch. In at least one embodiment, the manifold further includes a valve, wherein activation of the switch actuates the valve to turn on and turn off fluid flow to the filter cartridge.

In an embodiment, the first correlated magnet plurality of magnetic field emission sources are aligned with a plurality of magnetic field emission sources of the second correlated magnet, such that a repulsion force is generated between the magnets when the filter cartridge is axially inserted within the sump and moved to the alignment position.

The sump may further include an alignment thread or channel for mechanically coupling with a rib or fin extending radially outwards from the filter cartridge housing body when the filter cartridge is axially inserted within the sump.

In an embodiment, the first correlated magnet is disposed within a translatable magnet housing of the switch assembly, the magnet housing normally biased towards the longitudinal axis of the sump by a spring and slidable linearly as a result of the magnetic communication in a direction normal to the longitudinal axis of the sump to contact the actuator to activate the switch.

In still another aspect, the present invention is directed to a filter cartridge, comprising a housing having a body and a top portion forming a fluid-tight seal with the body, the top portion including ingress and egress fluid ports, and an axially-extending protrusion integral with or connected to the housing top portion, a filter media disposed with the housing body, and a first correlated magnet disposed within or connected to the housing top portion axially-extending protrusion and having a face oriented parallel to a longitudinal axis of the housing body. In an embodiment, the axially-extending protrusion is off-axial center of the filter housing top portion. The first correlated magnet comprises a plurality of magnetic field emission sources having positions and polarities relating to a predefined spatial force function that corresponds to a predetermined alignment of the plurality of magnetic field emission sources. The first correlated magnet is adapted to be in close proximity to a complementary or paired second correlated magnet when the filter cartridge is axially inserted into an alignment position with a sump of a filter manifold.

In an embodiment, the filter cartridge further includes a rib or fin extending radially outwards from the housing body, the rib or fin adapted for mechanically coupling with an alignment thread or channel of the sump when the filter cartridge is axially inserted within the sump.

In still yet another aspect, the present invention is directed to a method of interconnecting a filter cartridge and filter manifold, comprising: inserting a filter cartridge comprising a correlated magnet disposed within or connected to the housing top portion axially-extending protrusion and having a face oriented parallel to a longitudinal axis of the housing body, as described above, into a sump of the filter manifold; axially inserting the filter cartridge within the sump into an alignment position; aligning the first correlated magnet plurality of magnetic field emission sources with a plurality of magnetic field emission sources of a complementary or paired second correlated magnet such that a repulsion force is generated between the magnets, the second correlated magnet operably coupled to a switch assembly axially disposed with respect to the sump; and causing the second correlated magnet to translate in a direction normal to a longitudinal axis of the sump as a result of the magnetic communication to contact an actuator to activate the switch.

The sump may further include an alignment thread or channel for mechanically coupling with a rib or fin extending radially outwards from the filter cartridge housing body, and the method may further comprise the steps of: aligning the filter cartridge rib or fin with the alignment thread or channel while inserting the filter cartridge within the sump; and causing the filter cartridge rib or fin to travel to an end of the alignment thread or channel while axially inserting the filter cartridge to the alignment position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3 depicts a perspective view of a green filter cartridge according to an embodiment of the present invention. The filter cartridge includes a first correlated magnet radially attached to one of the filter cartridge end caps;

FIG. 4 depicts a perspective view of a green filter cartridge according to an embodiment of the present invention, with the dry change sleeve removed;

DESCRIPTION OF THE EMBODIMENT(S)

Figure 1:
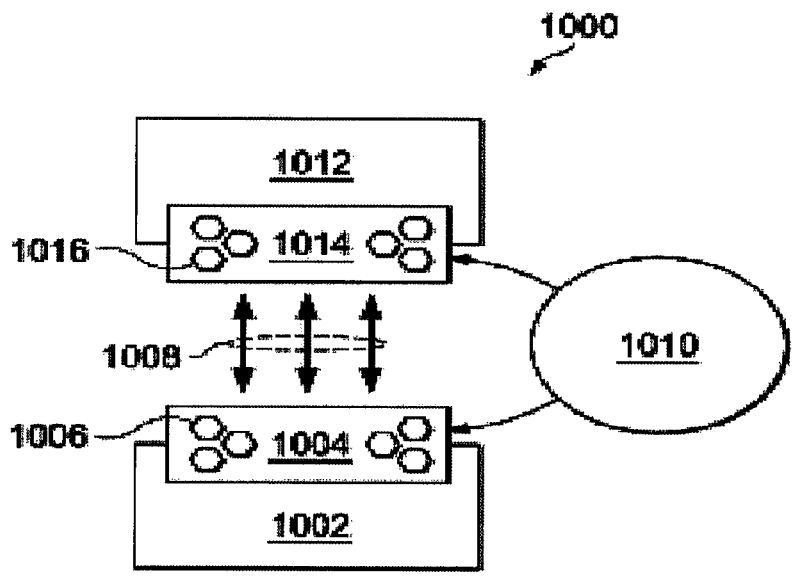
FIG. 1 depicts an apparatus of the prior art having two components magnetically attached to one another.
Figure 2:
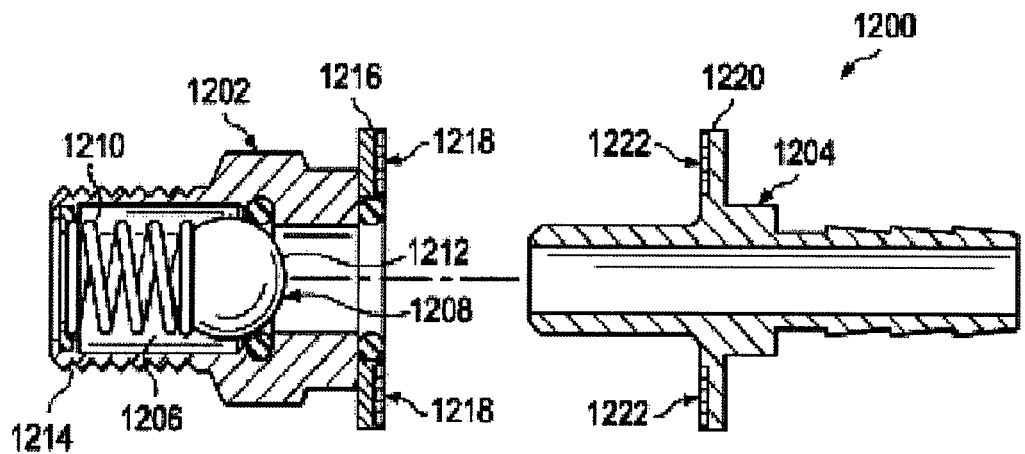
FIG. 2 depicts a quick connect air hose coupling of the prior art showing placement of correlated magnets for attachment.

In describing the embodiments of the present invention, reference will be made herein to FIGS. 1-35 of the drawings in which like numerals refer to like features of the invention.

Certain terminology is used herein for convenience only and is not to be taken as a limitation of the invention. For example, words such as "upper," "lower," "left," "right," "front," "rear," "horizontal," "vertical," "upward," "downward," "clockwise," "counterclockwise," "longitudinal," "lateral," or "radial", or the like, merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the words "exemplary," "illustrative," or the like, are used to mean serving as an example, instance or illustration. Any aspect or design described herein as "exemplary" or "illustrative" is not necessarily intended to be construed as preferred or advantageous over other aspects or design. Rather, the use of the words "exemplary" or "illustrative" is merely intended to present concepts in a concrete fashion.

Correlated magnets, also interchangeably referred to herein as coded polymagnets, contain areas of alternating poles. These patterns of alternating poles can concentrate and/or shape magnetic fields to give matching pairs of magnets unique properties. The present invention utilizes correlated magnet designs with "high auto-correlation and low cross-correlation" which is a characteristic of correlated magnets which only achieve peak efficacy (magnet attraction or repulsion) when paired with a specific complementary magnet. An example of such use of correlated magnets is disclosed in U.S. Pat. No. 8,314,671 issued to Correlated Magnets Research LLC on Nov. 20, 2012, entitled "KEY SYSTEM FOR ENABLING OPERATION OF A DEVICE." Correlated magnets are also characterized by dense and tunable magnetic fields, allowing for specifically engineered force curves with higher force at shorter working distances.

Figure 35:
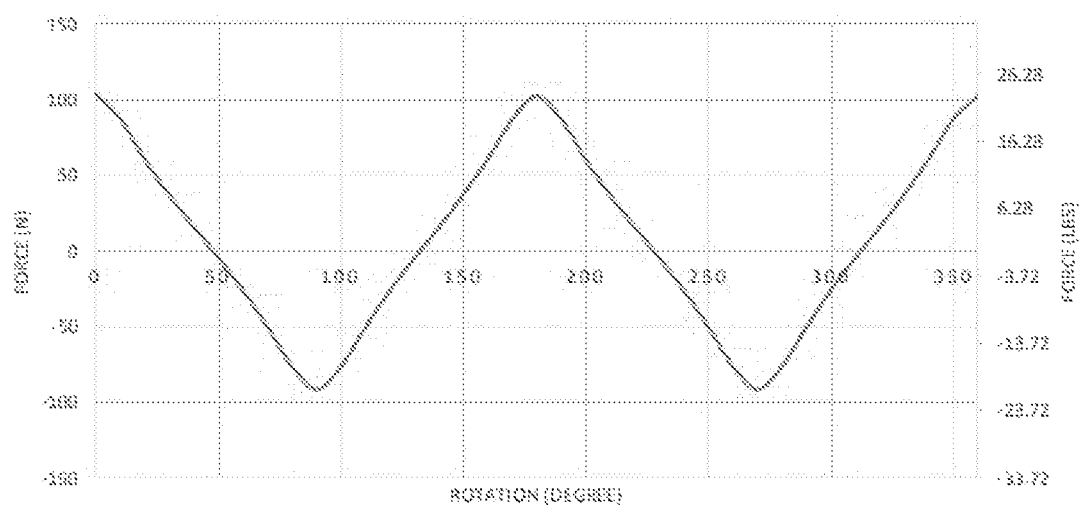
FIG. 35 illustrates a graph of varying magnetic forces of correlated magnets that depend on the relative rotational orientation of a pair of magnets (e.g., repulsion-attraction-repulsion-attraction at 90 degree intervals).

In addition, correlated magnets can be designed to have varying magnetic forces depending on the relative rotational orientation of the pair of magnets (e.g., repulsion-attraction-repulsion-attraction at 90-degree intervals) as illustrated on the graph of FIG. 35.

The present invention utilizes a magnetic repulsion model applied to a filter interconnect, which allows for a higher degree of control and flexibility over the timing and actuation of critical system functions through an engineered system of correlated magnets, springs and simple machines. Integral to the design is a matching set of "keyed" correlated magnets disposed in/on the filter cartridge housing and filter manifold, respectively, which provide the initial drive to engage downstream functions through non-electric and non-contacting actuation of an electronic system. The embodiments of the present invention described herein illustrate the actuation of a downstream valve (e.g., spool valve or other valve design) to allow for the flow of water; however, it should be understood by those skilled in the art that actuation of a valve is only one example of a downstream component intended to be within the scope of the present invention and that other components are not precluded, such as a dosing system or other electronic system.

This is accomplished by having a pair of magnets, preferably correlated magnets, oriented parallel to one another on each component of the connecting pair when in an alignment position, wherein a first coded polymagnet is disposed on a filter cartridge and a complementary, paired coded polymagnet is located on the manifold designed to secure the filter cartridge into position. It should be understood by those skilled in the art that a "correlated magnet" or "coded polymagnet" as referred to herein may comprise a single magnet with a plurality of polarity regions or, alternatively, may comprise multiple magnets arranged to create a polarity pattern with the desired characteristics. In at least one embodiment, a thin layer of material is introduced, physically separating the two polymagnets so they cannot have physically contacting surfaces, but they can still magnetically repel one another.

When a correct set of "keyed" polymagnets are aligned and brought into an effective working distance, the result is a repulsion force between the two magnets. The polymagnet disposed on the filter cartridge is fixed; however, the corresponding polymagnet disposed in/on the mating filter manifold is permitted to translate, acting against the mechanical force of a spring. The function of the magnet located on the manifold is to assist in actuating a valve (e.g., spool valve, cam and poppet valve, and other valve types) through activation of an electronic switch, normally biased in a first position by a spring. As will be described in more detail below, the force curves of the spring and correlated magnet couple are engineered such that only a set of corresponding "keyed" polymagnets will provide sufficient magnetic force to overcome the spring force to activate the switch. When the spring is fully depressed, one or more critical system functions are actuated, i.e., upstream and/or downstream valves, dosing systems, or other electronic systems, for example.

During installation, the filter cartridge may be guided by an alignment rail or thread and boss/lug system so that the correlated magnet disposed on the filter cartridge and the corresponding correlated magnet on the manifold are aligned (in-phase forming a repulsion force) but not in contact, when in the INSTALLED-LOCKED position. In at least one embodiment, the correlated magnet in the manifold physically actuates a limit switch when repelled by the filter magnet. When the filter is first fully inserted into the manifold in an INSTALLED-UNLOCKED position, the O-rings are sealed but the filter and manifold magnets are not aligned, and consequently, the upstream and/or downstream valve(s) are not open and water is not permitted to flow through the filter element. The filter assembly is then rotated 90-degrees into the INSTALLED-LOCKED position, which brings the "keyed" correlated magnets into alignment, thereby achieving peak efficacy (magnetic repulsion), overcoming a spring force and causing the manifold magnet to translate linearly to actuate a limit switch. In an embodiment, the positive engagement of the switch opens upstream and/or downstream valves and allows for the flow of water.

Figure 5:
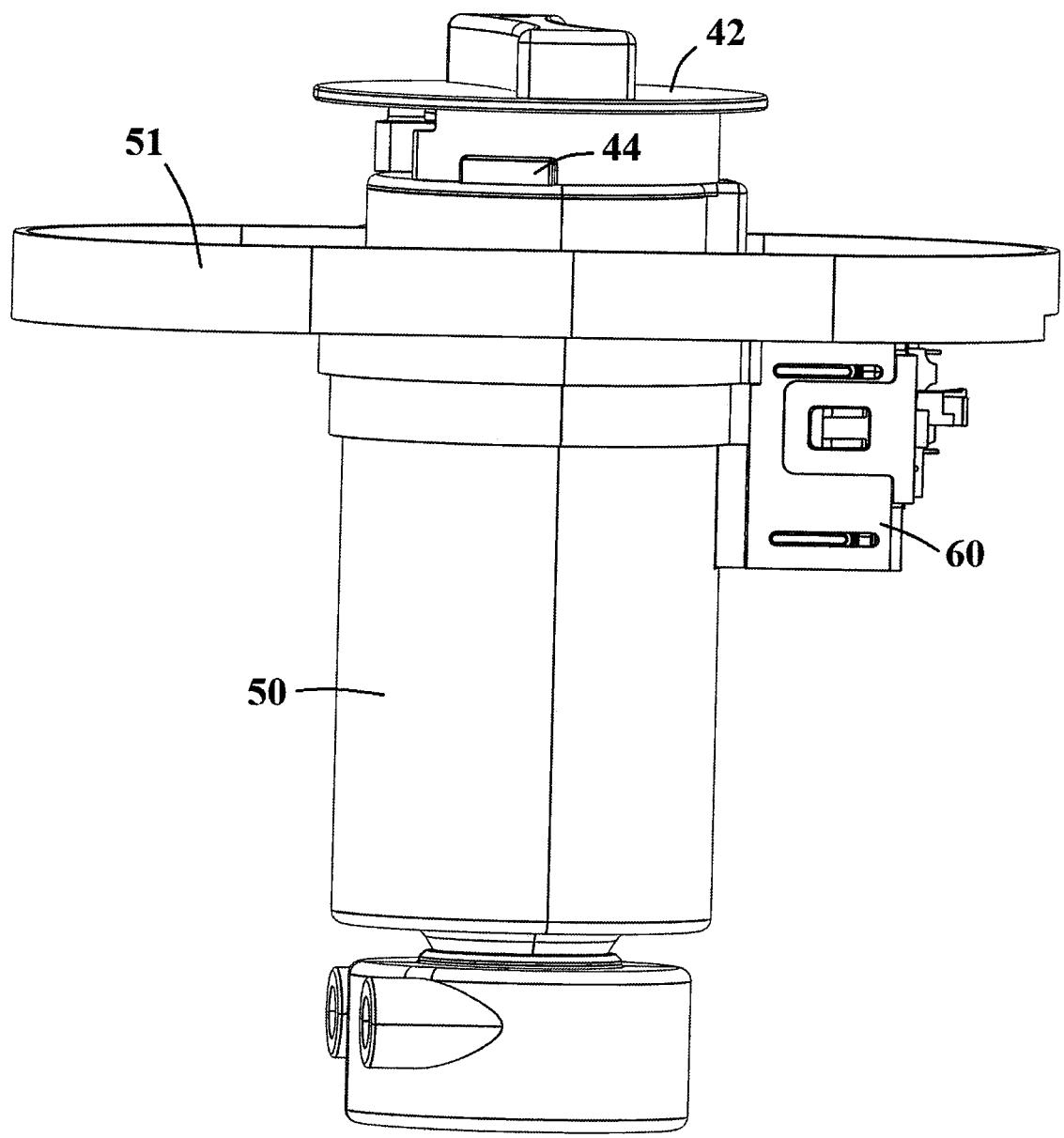
FIG. 5 depicts a side plan view of a filtration system including a green filter cartridge and corresponding filter manifold according to an embodiment of the present invention, with the filter cartridge in an uninstalled position. The filter manifold includes a second, paired correlated magnet operably coupled to an electronic switch for engaging downstream system functions.

Referring now to FIGS. 3-14, collectively, one embodiment of the filter cartridge and manifold of the present invention is shown. Replaceable filter cartridge 30 comprises a filter media 32 encased between end caps 34, 36 and includes a correlated magnet 40 located at the cartridge top end proximate the outside surface of the cartridge body. End cap 36 includes a manifold cup 35 integral therewith for securing filter media 32 and facilitating connection to manifold 50. As shown in FIGS. 3 and 4, end cap 34 may include a downward, axially-extending magnetic housing 39 which secures on its outside surface or embedded therein magnet 40. Filter cartridge 30 further includes an axial stem 31 comprising ingress and egress fluid ports. Filter cartridge 30 is initially insertable within a sump housing 56 in manifold 50 into a partially-INSTALLED position, wherein the O-rings are sealed but the downstream valve(s) are not open and water is not permitted to flow (FIG. 5). Surrounding filter media 32 and filter cup 35 is a dry change sleeve 33 forming the filter cartridge body, which is disposed between filter media 32 and sump 56 when the filter cartridge is inserted into the sump.

Figure 6:
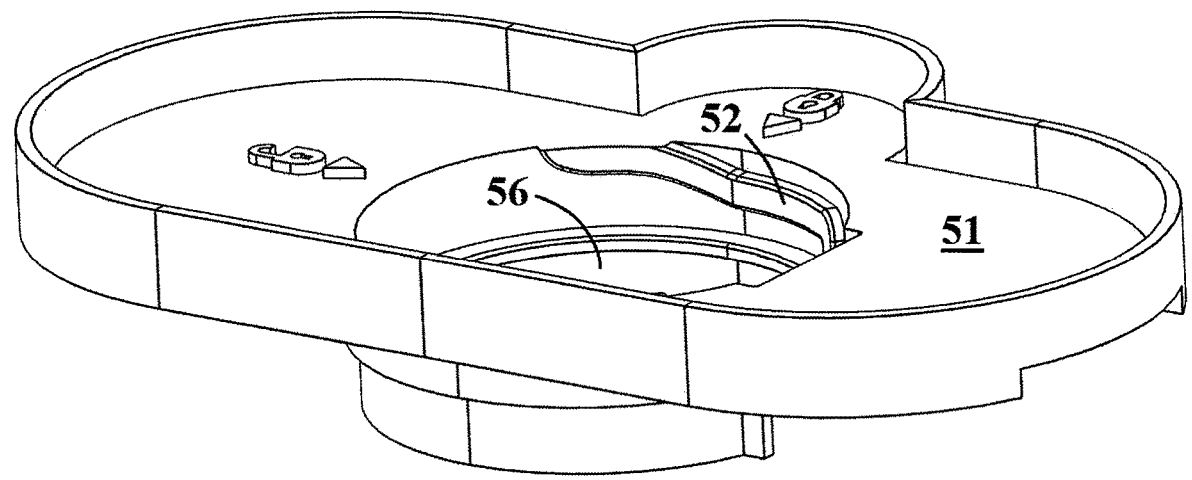
FIG. 6 depicts a perspective view of a locking plate for a filter manifold in accordance with an embodiment of the present invention.
Figure 7:
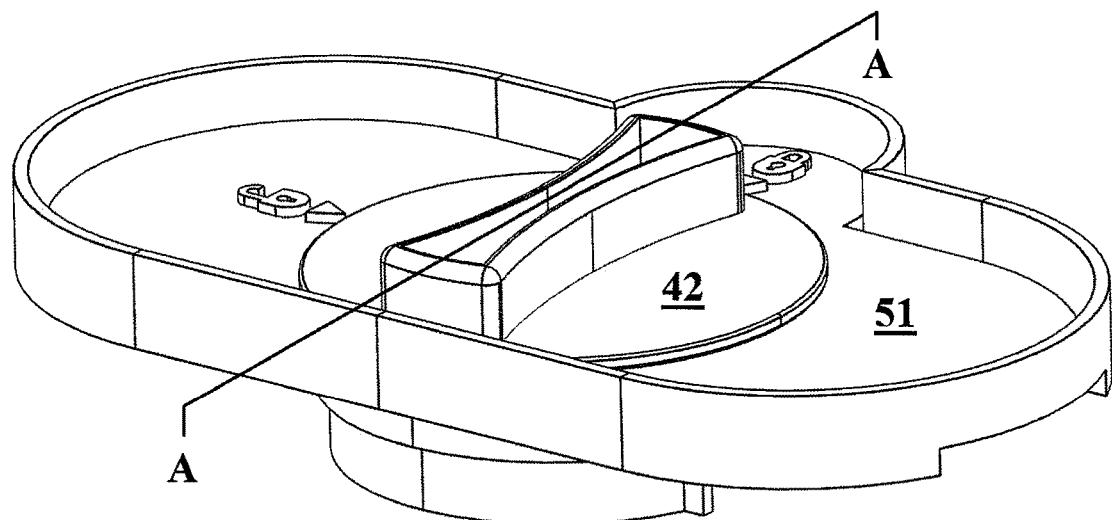
FIG. 7 depicts a perspective view of the locking plate of FIG. 6 with a locking cover for a filter cartridge according to an embodiment of the present invention in an installed position.
Figure 8:
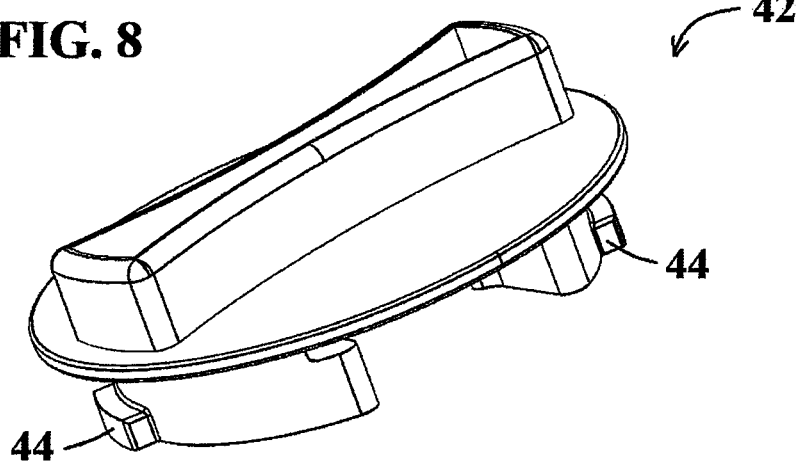
FIG. 8 depicts a perspective view of the filter cartridge locking cover of FIG. 7.
Figure 9:
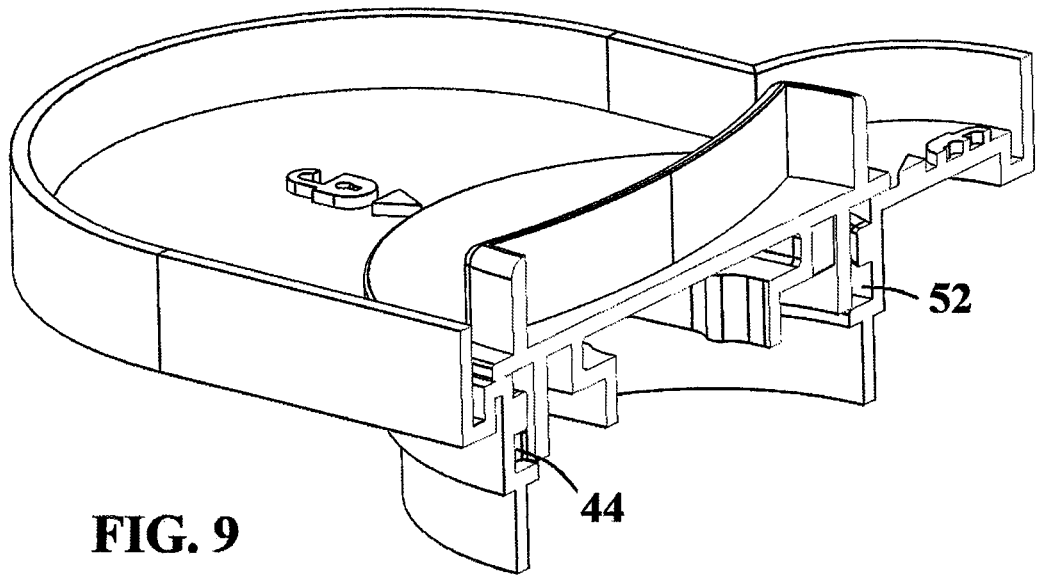
FIG. 9 depicts a perspective, cross-sectional view of FIG. 7 taken along line A-A, showing a boss or lug radially disposed on the locking cover being received and guided in an alignment rail or thread of the manifold locking plate as the filter cartridge moves into the installed position.
Figure 13:
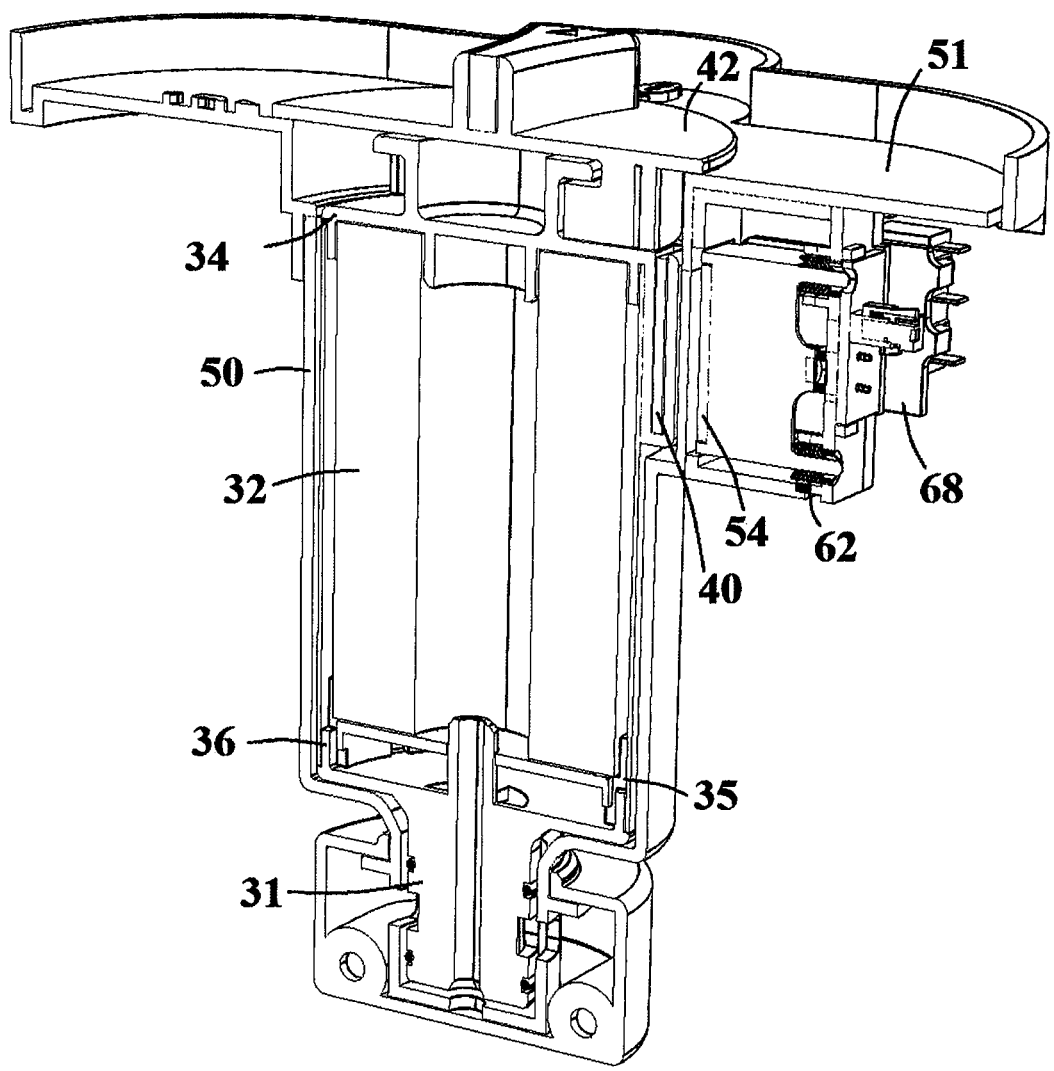
FIG. 13 depicts a perspective, cross-sectional view of the filtration system of FIG. 12.

As shown in FIG. 5, and best seen in FIGS. 6-7, in an embodiment, manifold 50 may include a radially-extending locking plate 51 including an aperture for permitting insertion of filter cartridge 30 into sump 56 and further including an alignment rail or thread 52 representing an "entry track" for filter cartridge 30 by receiving filter boss or lug 44 of locking cover 42 when filter cartridge 30 is inserted within sump housing 56 and connected to manifold 50. Thread 52 may be a "Z-thread" and is threaded to allow for 90-degree rotation of the filter cartridge 30 from a first, unlocked position to a second, locked position, as shown in FIG. 6. It should be understood by those skilled in the art that alignment thread 52 is not limited to a "Z-thread" or other continuous, segmented path, and that otherwise-shaped continuous pathways or threads are within the scope of the invention so long as the thread functions to bring the correlated magnets 40, 54 within an effective working distance as the filter cartridge is inserted within the sump. As shown in FIGS. 7 and 8, a locking cover 42 may be connected to filter cartridge end cap 34 to aid in filter assembly installation. As the locking cover 42 is rotated, boss or lug 44 travels along alignment rail 52 to its end, pushing the filter cartridge axially downward (i.e., into the sump). As can be seen in FIG. 13, this end rotational position of boss or lug 44 within alignment rail 52 places the filter cartridge 30 and filter magnet 40 in an alignment position for filtering operation. In the embodiment shown, locking cover 42 is rotatable about the longitudinal axis of the sump, while the filter cartridge translates axially and does not rotate; however, it should be understood by those skilled in the art that in other embodiments, end cap 34 and locking cover 42 may be one molded piece rather than two connected structures, such that the filter cartridge rotates into the alignment position. In still other embodiments, the filter assembly does not include a locking cover and the filter cartridge end cap includes a boss or lug radially disposed on an outer surface thereof for being received in an alignment channel or track of the manifold.

Figure 10:
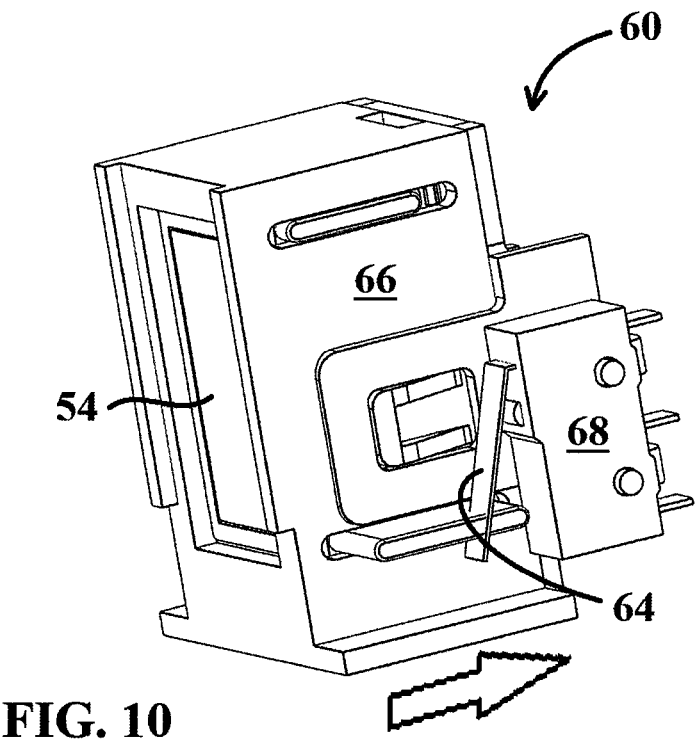
FIG. 10 depicts a perspective view of a switch assembly in accordance with an embodiment of the present invention.
Figure 11:
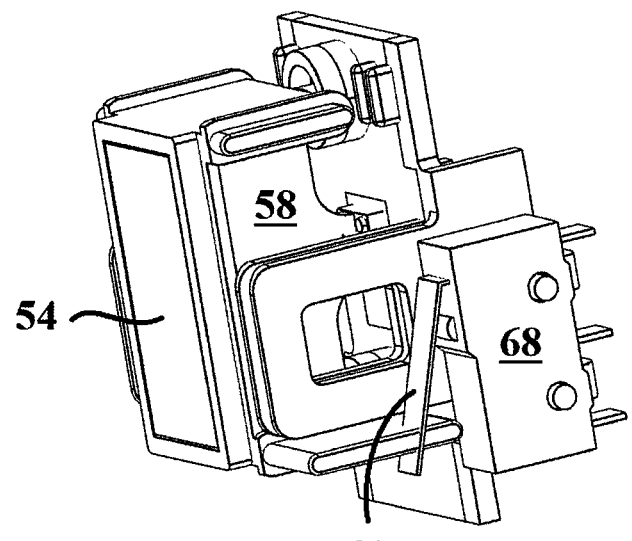
FIG. 11 depicts a perspective view of the switch assembly of FIG. 10, with mounting bracket removed to show the interior components of the assembly.

As further shown in FIG. 5, and best seen in FIGS. 10-11, manifold 50 includes a correspondingly "keyed" or paired correlated magnet 54 positioned for alignment with filter magnet 40 when boss or lug 44 is at the end of alignment rail 52. Magnet 54 is part of a switch assembly 60 for actuating a downstream valve. As shown in FIG. 10, switch assembly 60 is disposed within mounting bracket 66 and comprises magnet 54, spring 62 and actuator 64 mechanically linked to a set of contacts for limit switch 68. Magnet 54 is non-rotatable but slidable linearly within magnet housing or holder 58 in a direction normal to the longitudinal axis of the sump. Holder 58 with magnet 54 is operably coupled with limit switch 68, which is normally biased in the closed position by spring 62.

Figure 12:
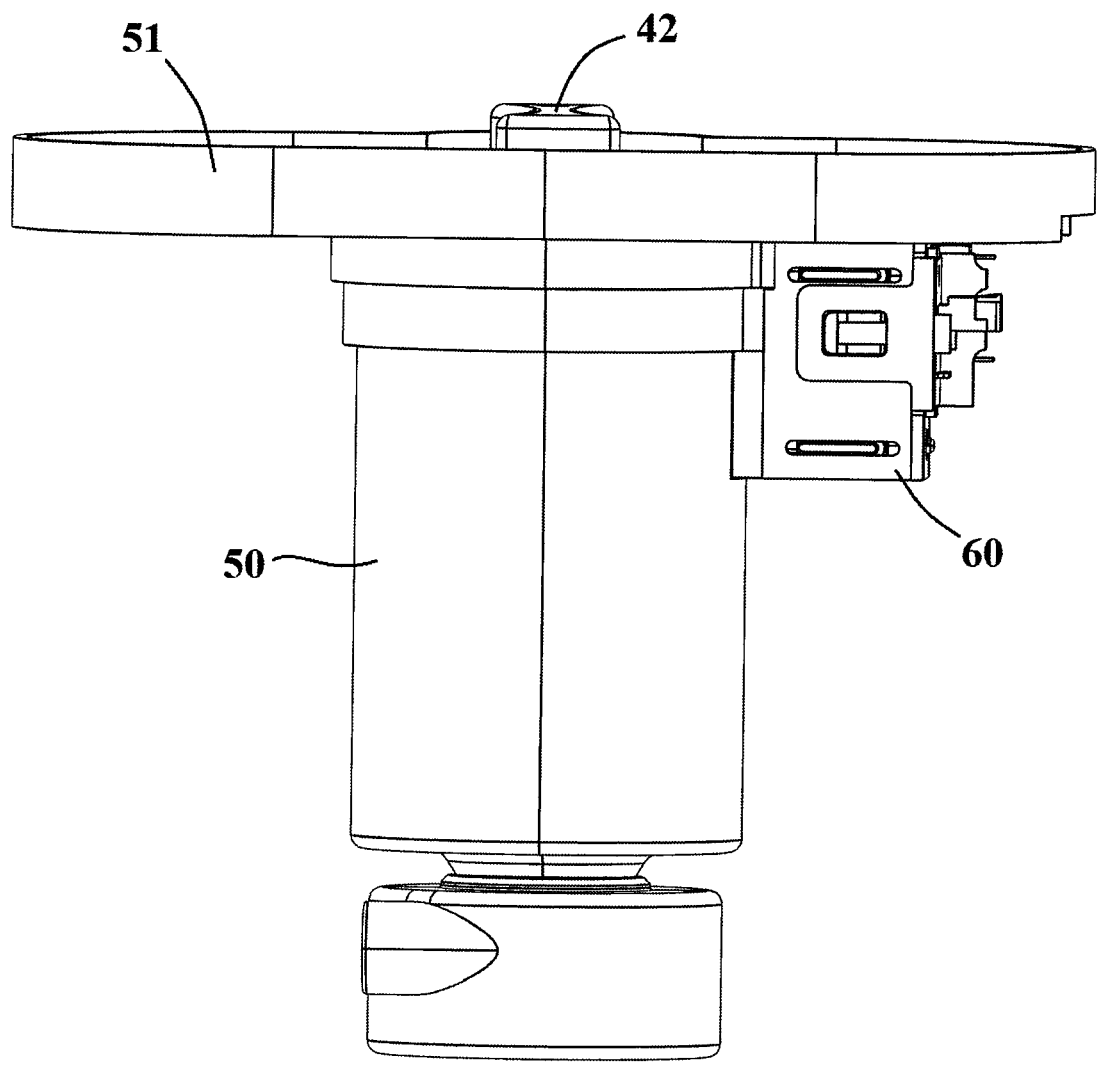
FIG. 12 depicts a side plan view of the filtration system of FIG. 4, with the filter cartridge in an installed position and the switch activated.
Figure 14:
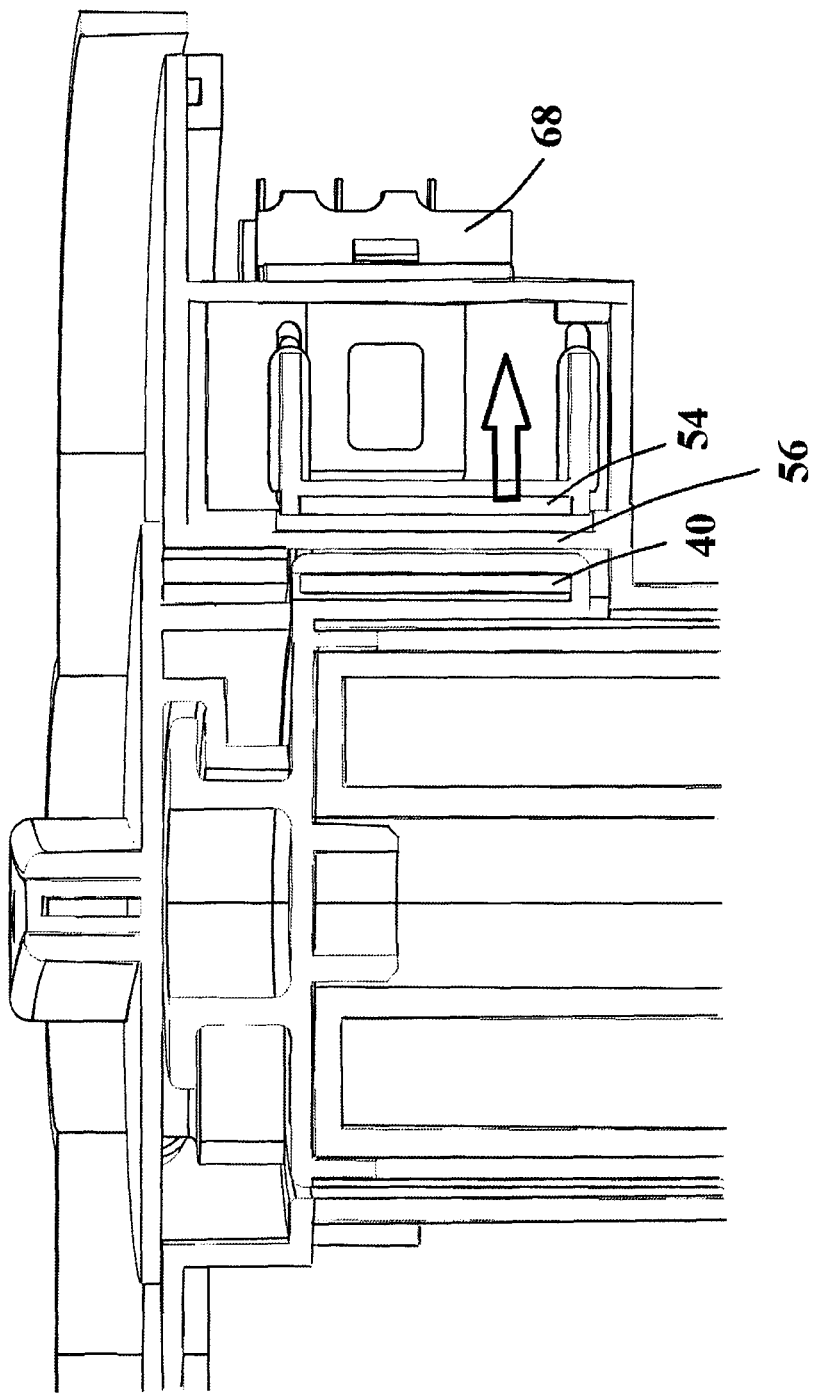
FIG. 14 depicts a side, plan view of the filtration system of FIG. 13, showing the position of the paired correlated magnets when the filter cartridge is in an installed position.

When filter magnet 40 and manifold magnet 54 are in alignment and brought into an effective working distance, as shown in FIGS. 12-14, the result is a repulsion force between the two magnets. The force curves of the spring 62 and magnet couple 40, 54 are engineered such that at peak efficacy, there is sufficient magnetic repulsion force to overcome the spring force of the switch, compressing the spring in the direction of the arrow, as shown in FIG. 14, and causing holder 58 to come into contact with actuator 64 to make the electrical connection to activate limit switch 68. When the spring is fully depressed, limit switch 68 is activated, which in turn actuates a valve (not shown), allowing for the flow of water. In one embodiment, as best seen in FIG. 14, when the filter cartridge 30 is in the INSTALLED-LOCKED position, filter magnet 40 and manifold magnet 54 are in an effective working distance of approximately 4 mm. Disposed between the magnets when the filter cartridge is connected to the manifold is a portion of sump housing 56, which prevents contact between magnets 40, 54 while still allowing for magnetic cooperation. Sump housing 56 is a molded piece of the filter manifold and acts as the pressure vessel for the filter cartridge, which is typically a plastic filter housing surrounding the filter media. The lack of a pressure bearing filter housing on the replaceable filter cartridge reduces the amount of plastic needed during manufacture of the filter cartridge and promotes "green" filtering. In an embodiment, filter cartridge 30 may include a sheath or other thin material layer comprising the filter cartridge "body," shown in FIG. 3 as polyethylene dry change sleeve 33, surrounding the filter media (which cannot absorb pressure) and is intended to allow for removal and replacement of the filter cartridge from the manifold by a user without contacting the wet filter media.

As further shown in FIG. 14, in an embodiment, spring 62 requires an additional 4 mm of travel to activate the limit switch 68, and therefore the paired correlated magnets 40, 54 are adapted to produce sufficient magnetic repulsion force for a distance of approximately 8 mm. Providing a magnetic repulsion force sufficient to double the required distance will safely accommodate design and manufacturing tolerances, and ensure switch activation. In that correlated magnets are characterized by dense and tunable magnetic fields, it is possible to specifically engineer force curves with higher force at shorter working distances. A conventional magnet would be unable to produce sufficient magnetic force over such a short effective distance without significantly increasing the physical size of the magnet, which would present design feasibility issues. It should be understood by those skilled in the art that for physically small magnets like those used in the present invention, correlated magnets are preferable because of the strength advantage attainable at very short working distances. It should be further understood by those skilled in the art that 4 mm is shown as an effective working distance between the magnets for exemplary purposes only, and that in other embodiments the effective working distance may be shorter than 4 mm, in accordance with design requirements. An effective working distance of greater than 4 mm is also achievable.

In addition to providing the initial drive to engage downstream system functionality, the magnetic communication between the filter and manifold magnets 40, 54 has the added benefit of providing filter authentication and anti-counterfeiting measures. Unless the polarity arrays or patterns of the correlated magnets 40, 54 are correspondingly "keyed" or paired, the magnetic communication will not actuate the switch assembly 60 and therefore the valve will not open to allow for water flow. As such, only a genuine OEM filter cartridge will function and a non-OEM or counterfeit filter cartridge will be non-operational. This also limits the counterfeiting market, which is especially important with respect to the safety of consumers seeking clean drinking water who believe that they may be able to save money by purchasing a non-authentic replacement filter cartridge which mechanically may connect to a mating manifold, but may nonetheless not have an enclosed filter media which is as effective for removal of contaminants or impurities in water as that of the filter media of a genuine replacement part.

Figure 15:
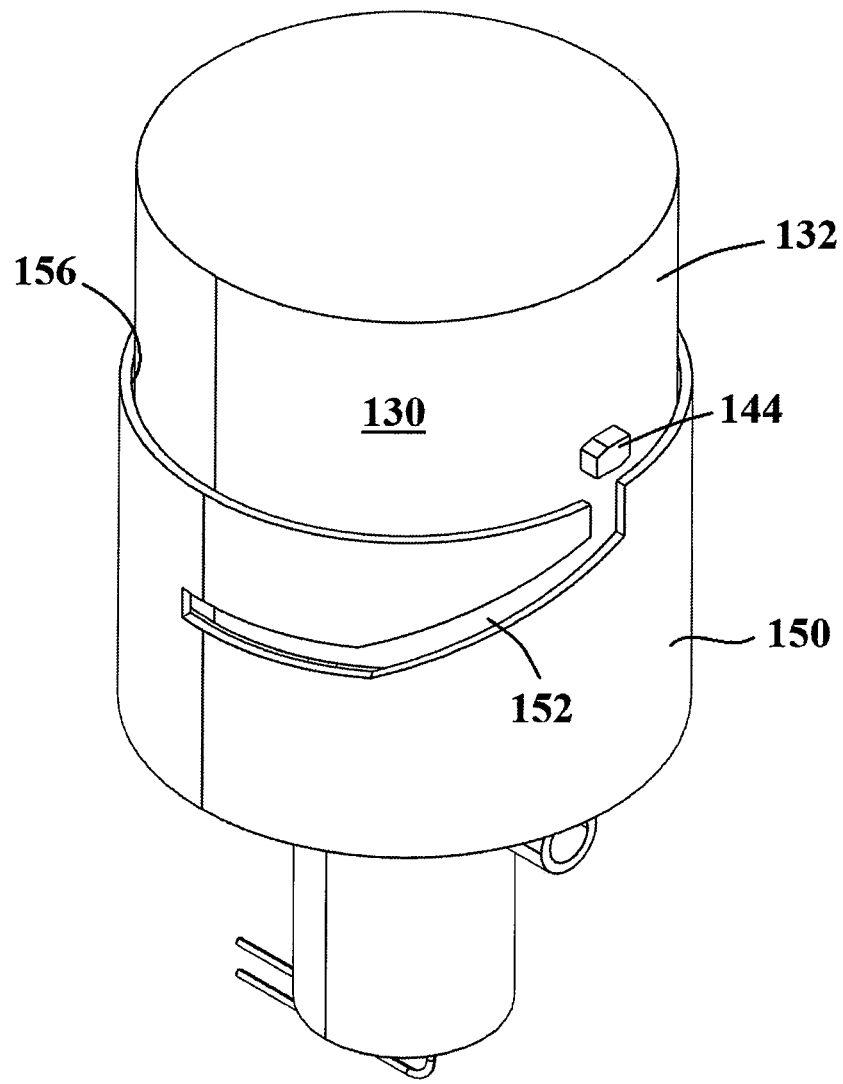
FIG. 15 depicts a perspective view of another embodiment of a filtration system including a filter cartridge and corresponding filter manifold according to the present invention, with the filter cartridge in an uninstalled position. In this embodiment, the filter cartridge includes a correlated magnet positioned parallel to the surface of the filter head and the matching, "keyed" second correlated magnet is operating coupled to a mating surface of the manifold for engaging an electronic switch.
Figure 16:
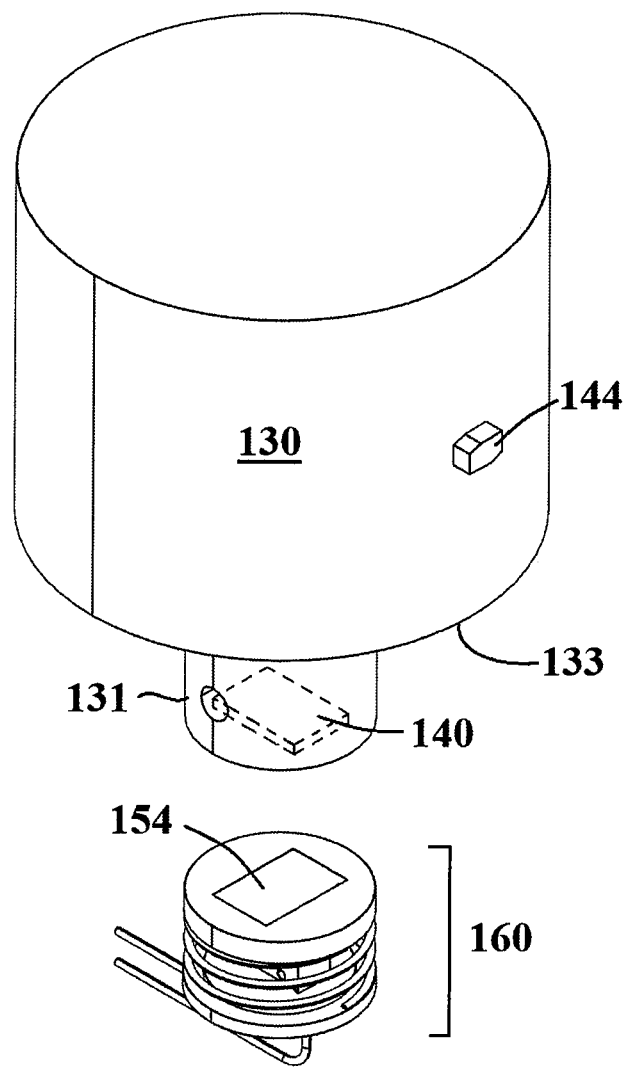
FIG. 16 depicts a perspective view of the filtration system of FIG. 15, with the filter manifold hidden to show the initial position of the correlated magnets.
Figure 18:
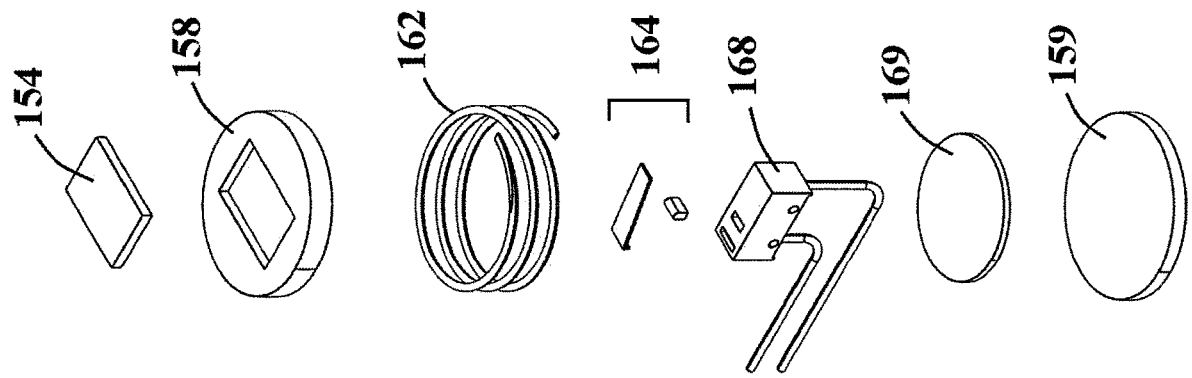
FIG. 18 depicts an exploded view of the switch assembly of FIG. 17.

Referring now to FIGS. 15-24, collectively, another embodiment of the present invention is shown, wherein the polarity arrays or patterns of the correlated magnets are characterized by relative rotational-orientation specific force curves. FIG. 15 shows the filter interconnect in an UNINSTALLED position. Replaceable filter cartridge 130 comprises an otherwise conventional filter media disposed within filter housing body 132. Filter cartridge 30 further includes an axial stem 131 and a first correlated magnet 140 disposed in the stem, parallel to the surface of the filter head 133 (FIG. 16). Filter cartridge 130 is initially insertable within a sump 156 in manifold 150 into an INSTALLED-UNLOCKED position, wherein the O-rings are sealed but the downstream valve(s) are not open and water is not permitted to flow (FIG. 15).

Figure 17:
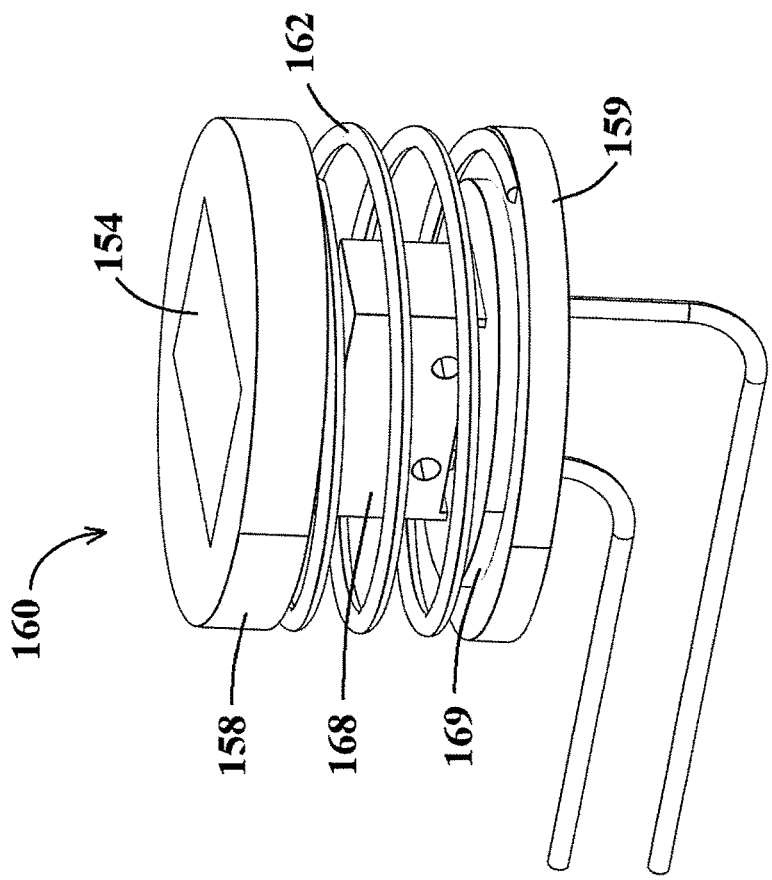
FIG. 17 depicts a perspective view of the switch assembly according to an embodiment of the present invention.
Figure 20:
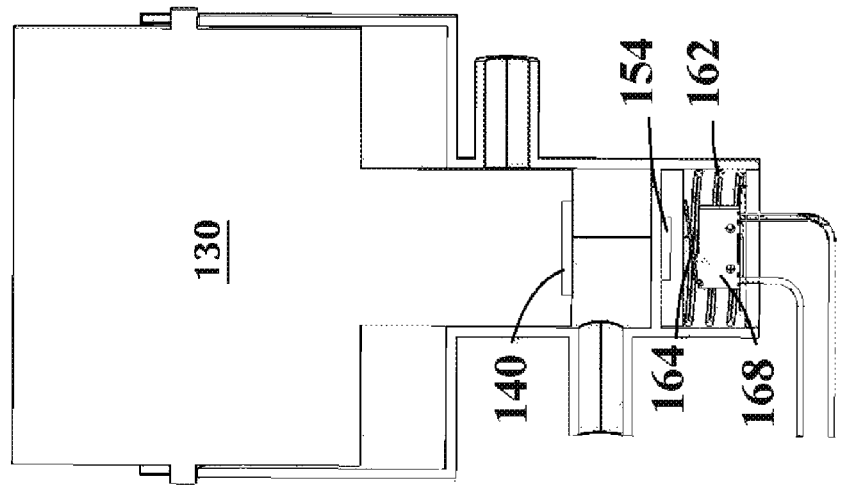
FIGS. 19 and 20 depict perspective and side, cross-sectional views, respectively, of the filtration system of FIG. 15 in an uninstalled position.

As shown in FIG. 16, in this embodiment, the pair of correlated magnets are positioned parallel to the surface of the filter head and the mating surface of the manifold, respectively. The filter magnet 140 is fixed in place, while the mating "keyed" manifold magnet 154 is part of a switch assembly 160 for actuating a downstream valve (not shown) and is supported by a spring 162 but is prevented from rotating. As shown in FIG. 17, switch assembly 160 comprises a second, paired correlated magnet 154 disposed within magnet holder or cap 158, which is normally biased in an extended axial position (i.e., toward filter magnet 140) by spring 162. Disposed within spring 162 is limit switch 168, which may be activated by actuator 164, and switch 168 connected to PCB 169. Base 159 completes the switch assembly. As shown in FIG. 17, PCB 169 may be connected to downstream system components, such as downstream valve(s), via lead wires.

The rotation of the filter during installation modulates the magnetic interaction from a region of net attraction/neutral to peak repulsion.

Figure 19:
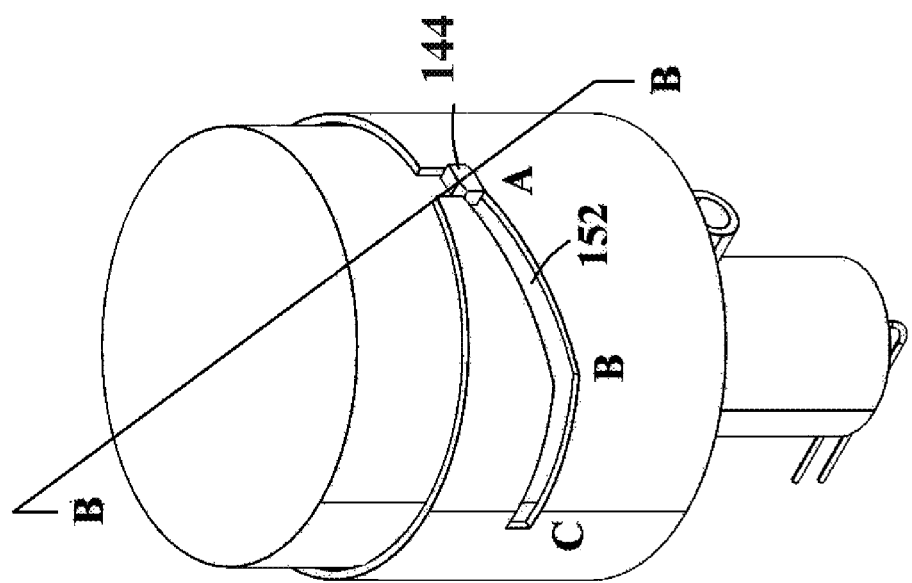

An alignment track or thread and associated filter boss system, comprising an alignment thread 152 on the manifold and a boss or lug 144 radially disposed on the filter cartridge housing 132, may be incorporated to provide control over the timing of the filter-manifold magnet orientation and working distance. FIGS. 19-24 depict one method of installation of filter cartridge 130 into manifold 150. As shown in FIGS. 19-24, alignment thread 152 may be a "Z-thread" for receiving filter boss or lug 144 as filter cartridge 130 is rotated into an INSTALLED-LOCKED position. FIG. 19 shows filter cartridge 130 in an initial, uninstalled position. At position A, in the initial installation step, the thread or track system functions to bring the filter and manifold magnets 140, 154 into an effective working distance and provides a mechanical advantage to seat the O-rings. At this relative orientation, the resulting magnetic force can be attractive, neutral or weakly-repulsive. As shown in the cross-sectional view of FIG. 20, and also shown in FIG. 16, at position A, magnets 140, 154 are 90-degrees out of phase or alignment.

Figure 22:
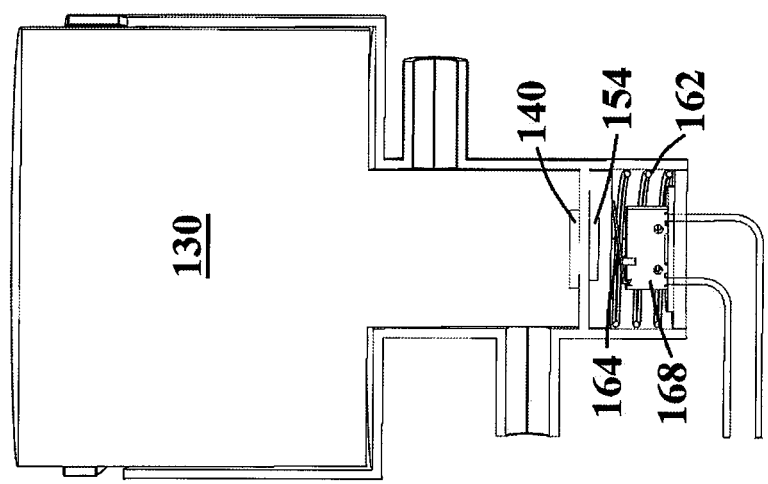
FIGS. 21 and 22 depict perspective and side, cross-sectional views, respectively, of the filtration system of FIG. 15, with the filter cartridge rotated 90-degrees within the filter manifold toward an installed position.
Figure 21:
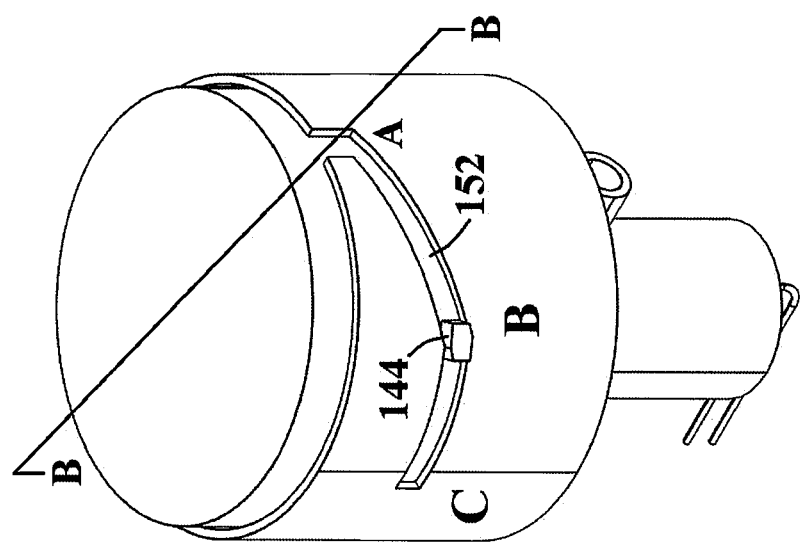
Figure 24:
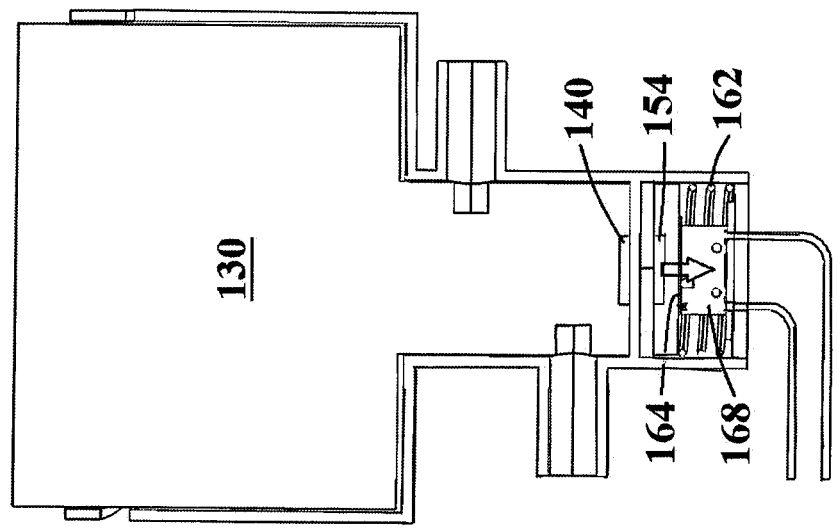
FIGS. 23 and 24 perspective and side, cross-sectional views, respectively, of the filtration system of FIG. 15, in an installed position.
Figure 23:
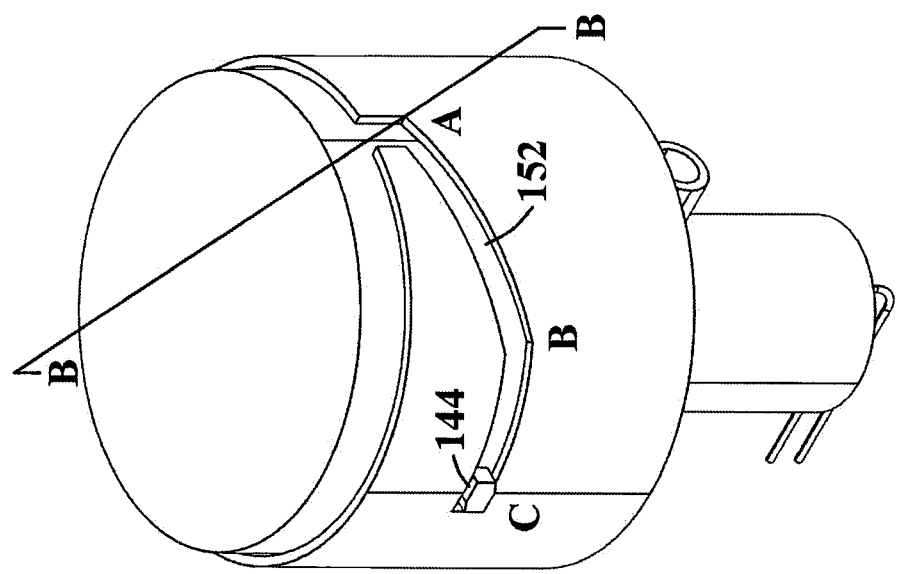

At position B, as shown in FIGS. 21-22, the filter O-rings are fully seated and the correlated magnet pair are within an effective working distance, but approximately 45-degrees out of phase. The relative orientation of the magnets enters a net repulsion region at approximately 45-degrees from alignment; however, the magnetic repulsion force is not sufficient to overcome the opposing spring force and drive the correlated magnet-spring system. As shown in FIGS. 23-24, at position C, filter cartridge 130 is rotated into the INSTALLED-LOCKED position or state, and the correlated magnet pair continue to be within an effective working distance. However, the relative orientation of the magnets has now resulted in peak repulsion (i.e., the magnets are in phase), producing a repulsion force which is sufficient to drive the correlated magnet-spring system and actuate the intended downstream system function(s). As shown in FIG. 24, the repulsion force between magnets 140, 154 has caused magnet holder 158 to translate axially downward in the direction of the arrow, thereby compressing spring 162 and causing actuator 164 to activate limit switch 168, thereby permitting intended downstream system function, such as actuation of a valve to allow filtered egress fluid flow.

In an embodiment, there may be a notch or detent at the end of the alignment thread to provide tactile feedback indicating successful installation of the filter cartridge.

The filter cartridge may be removed by reversing the actions described above and rotating the filter cartridge in the opposite direction, and extraction may be assisted by the magnetic repulsion force and the spring force. In at least one embodiment, there may be a dedicated exit track or rail which may exploit the net magnetic repulsion region to support extraction and removal of the filter cartridge.

Figure 25:
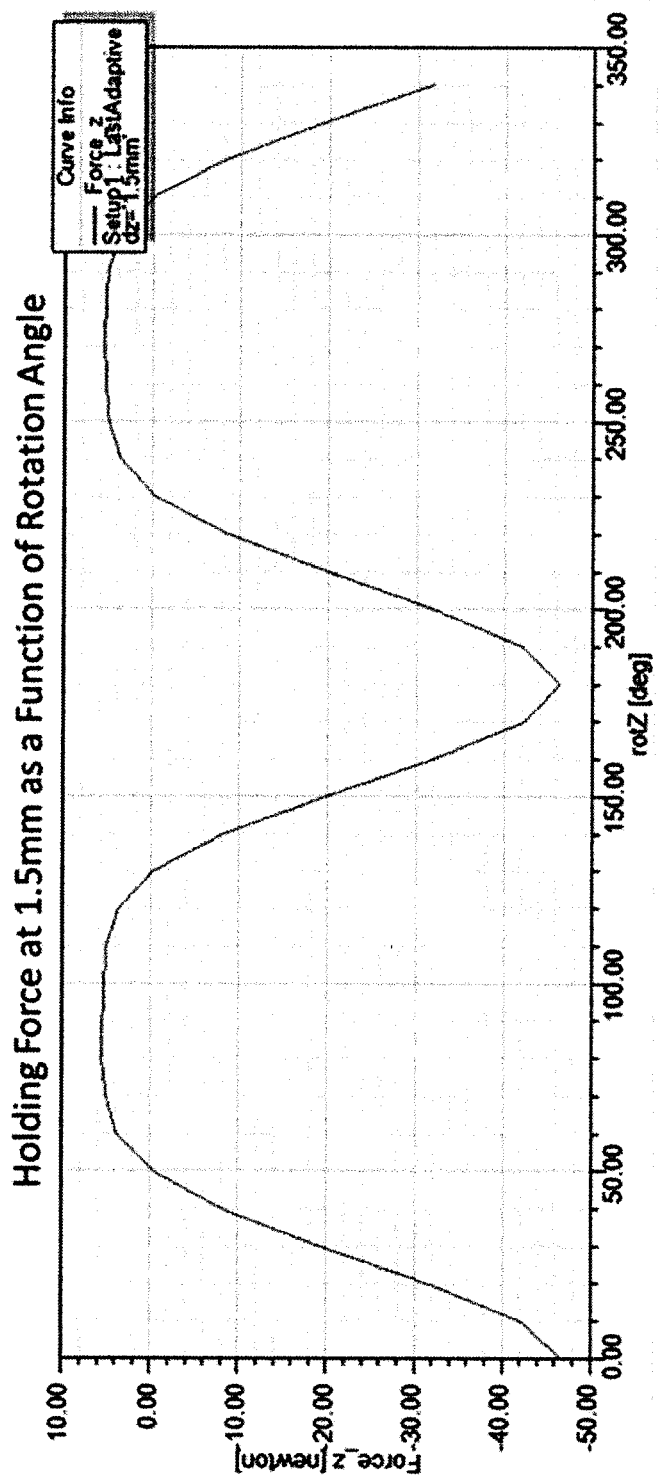
FIG. 25 depicts a graph of the magnetic holding force as a function of rotation angle as the pair of correlated magnets are rotated within an effective working distance in accordance with the method of installation shown in FIGS. 19-25.

FIG. 25 depicts the magnetic holding force as a function of rotation angle as the pair of correlated magnets are rotated within an effective working distance. As shown in FIG. 24, in one embodiment the pair of correlated magnets are at an effective working distance of approximately 1.5 mm when the filter cartridge is in an INSTALLED-LOCKED position.

It should be understood by those skilled in the art that in other embodiments, the polarity arrays or patterns of the correlated magnets are not characterized by relative rotational-orientation specific force curves, and the repulsion force exists regardless of magnet orientation. In such an embodiment the magnet patterns may be concentric, for example, and would not require rotation of the filter cartridge and associated correlated magnet in the theta direction to align the polarity arrays between the paired magnets to produce the desired repulsion force.

Figures 26, 27:
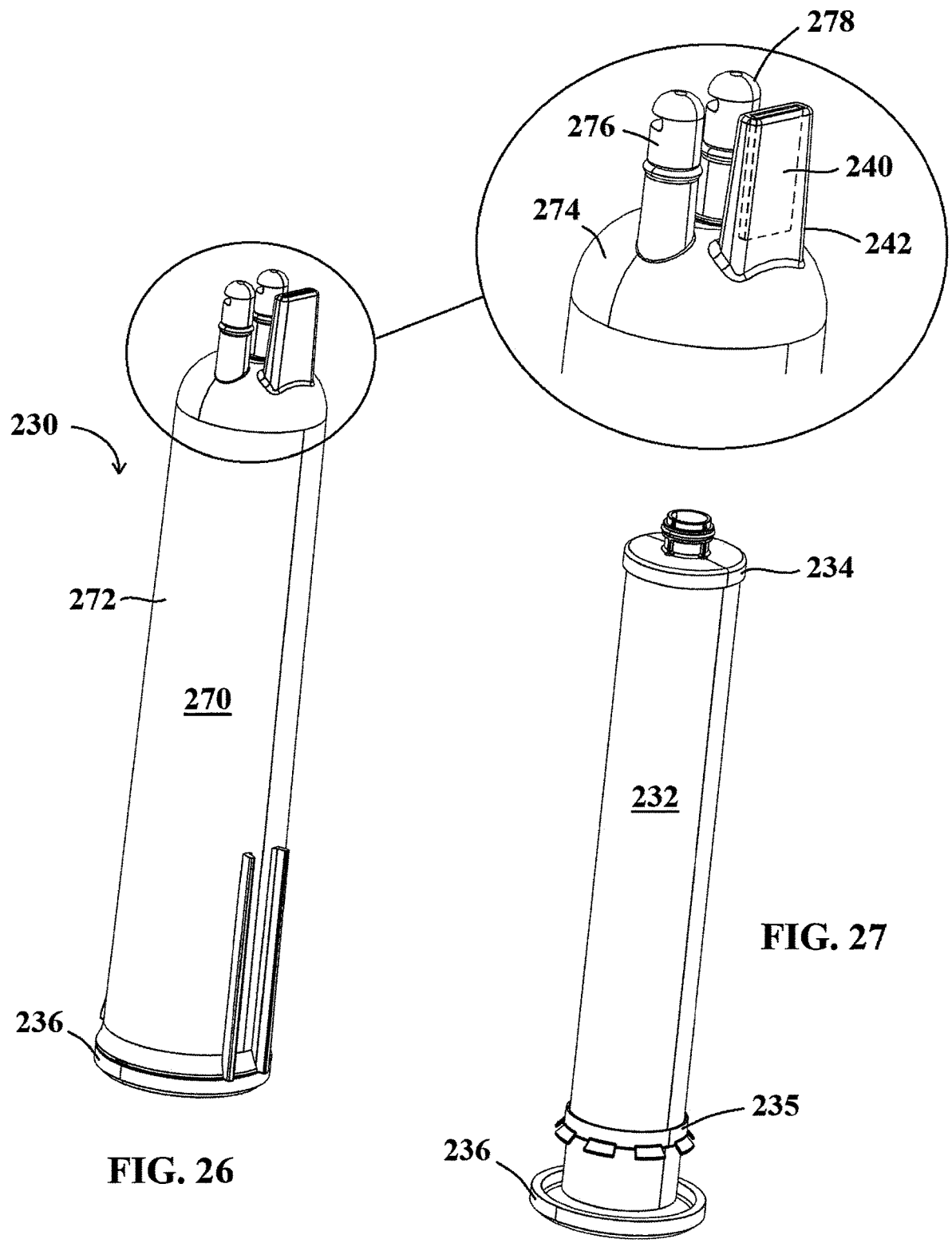
FIG. 26 depicts a perspective view of another embodiment of a filter cartridge according to the present invention, including a first correlated magnet extending upwards from a top portion of the filter cartridge housing, parallel with a longitudinal axis of the filter cartridge housing.
FIG. 27 depicts a perspective view of the filter cartridge of FIG. 26, with the filter cartridge housing removed.

Referring now to FIGS. 26-34, collectively, another embodiment of the filter cartridge and manifold of the present invention is shown. Filter cartridge 230 comprises a housing 270 having a body 272 and a top portion 274 forming a fluid-tight seal with the body. Top portion 274 includes fluid ingress and egress ports 276, 278. An otherwise conventional filter media 232 is sealed between end caps 234, 236 within the filter housing body 272. In this embodiment, filter cartridge 230 includes a filter magnet 240 extending axially from the filter cartridge housing top portion 274, parallel to the longitudinal axis of the filter cartridge housing body 272. As shown in FIG. 26, filter housing 270 includes an upward axially-extending portion 242 extending from top portion 274 integral with and off axial center of the filter housing, within which magnet 240 is disposed. It should be understood by those skilled in the art that in other embodiments, magnet 240 may instead be positioned within a magnet housing attached to the filter cartridge housing by other means, such as being connected to housing top portion 274 by snap fit or friction fit. Other means of attachment, such as welding or bonding, are not precluded.

Figure 28:
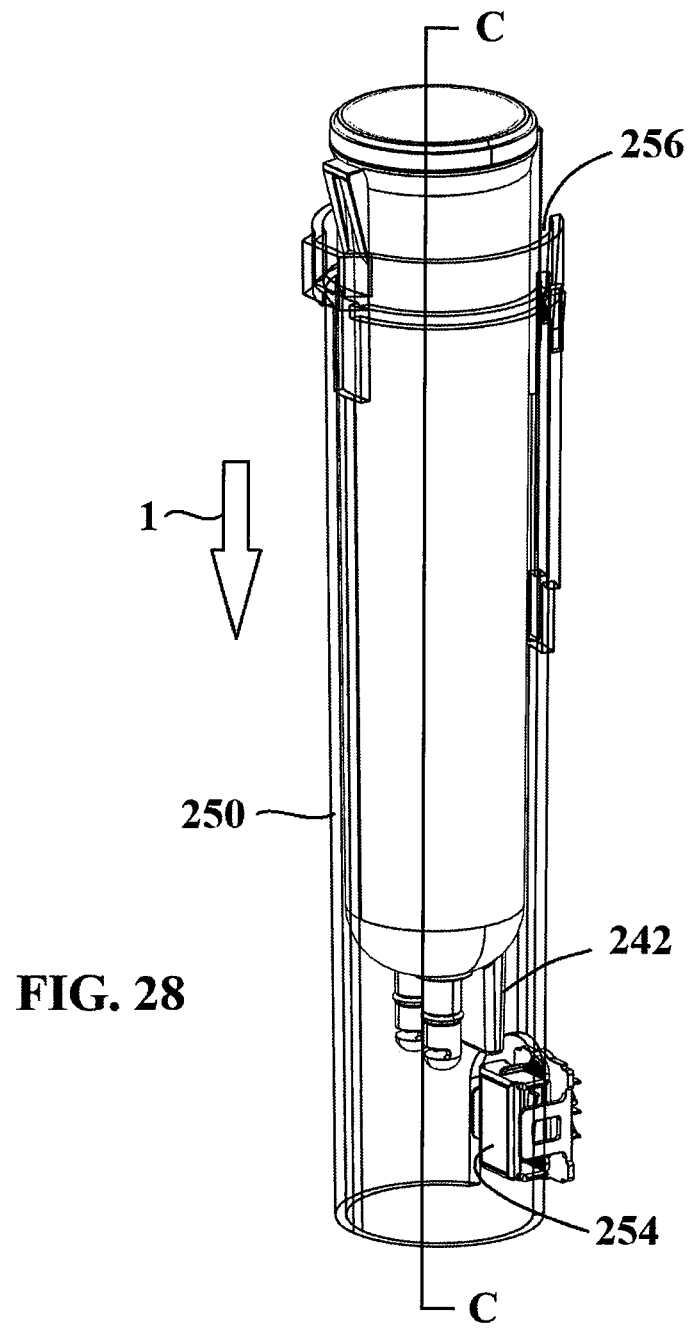
FIG. 28 depicts a perspective view of the filter cartridge of FIG. 26 and a mating filter manifold, in an uninstalled position. The filter manifold is partially transparent to depict the paired correlated magnet and switch assembly of the manifold.
Figure 29:
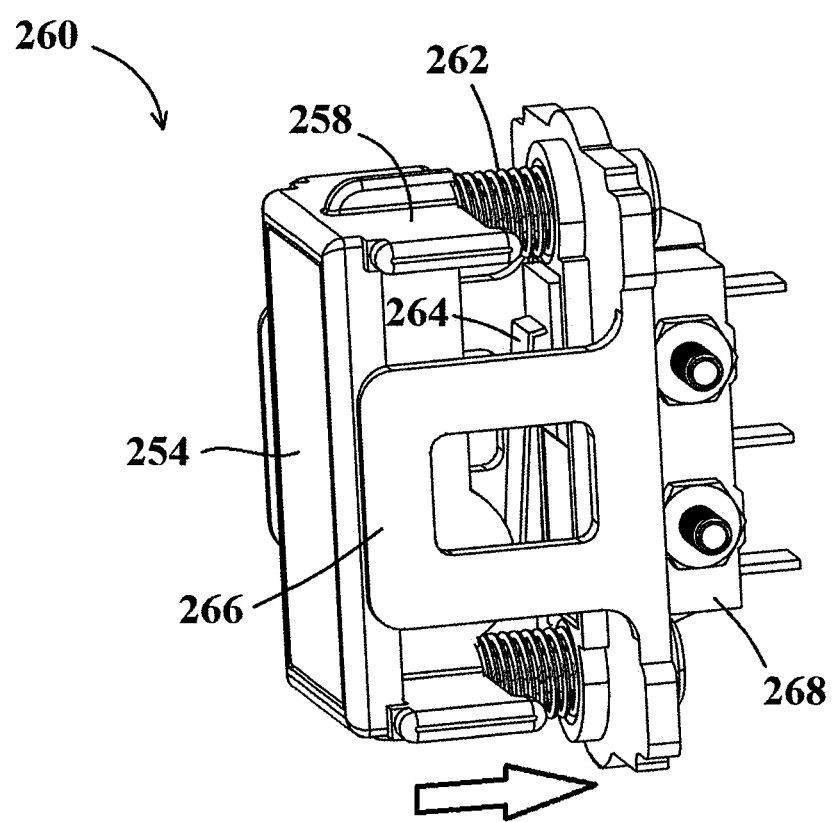
FIG. 29 depicts a perspective view of the switch assembly of FIG. 28.
Figure 34:
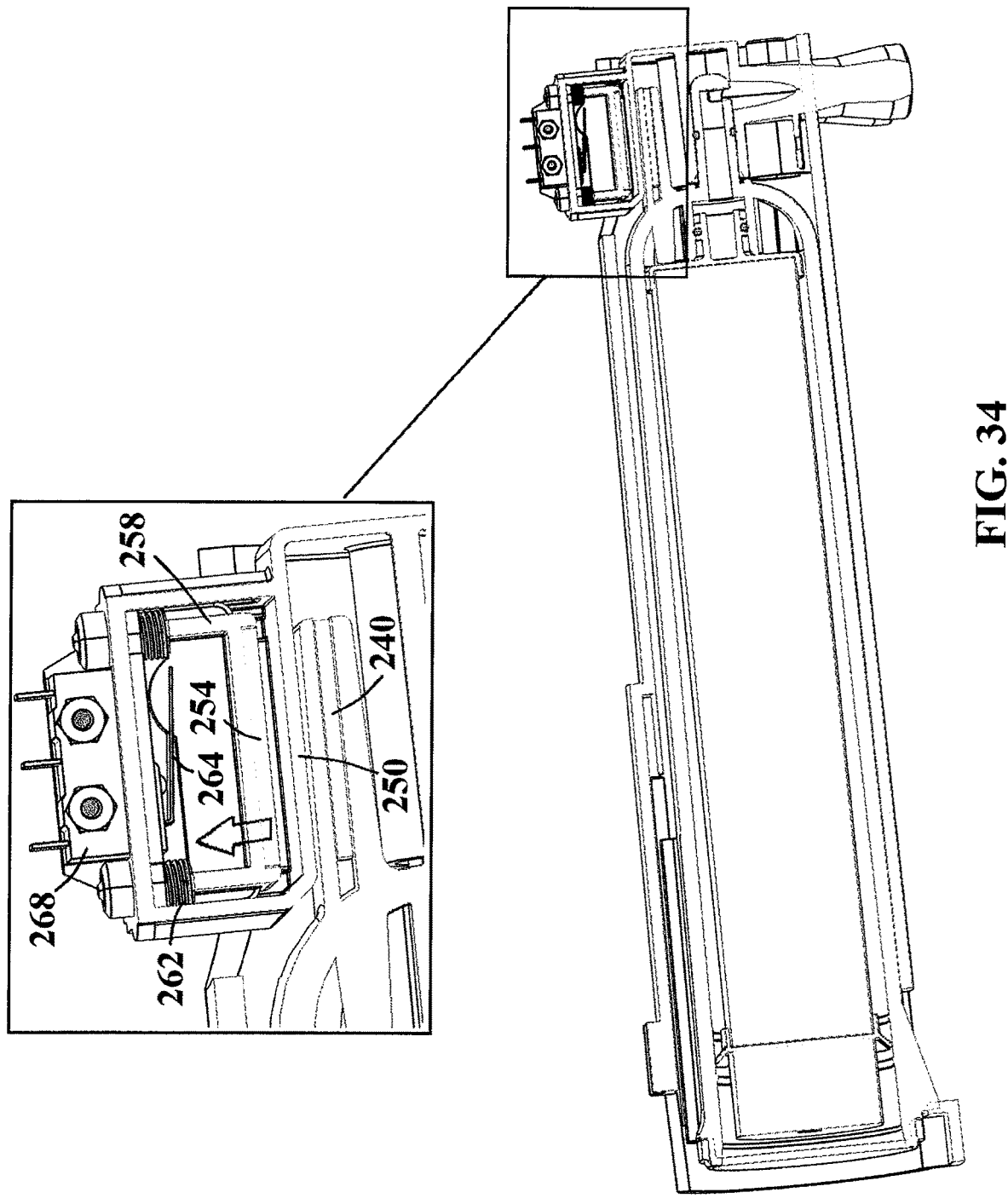
FIG. 34 depicts a perspective, cross-sectional view of the filter interconnect of FIG. 28, taken along line C-C, showing the filter cartridge in a connected or INSTALLED position or state, with the limit switch activated.

As shown in FIG. 28, filter cartridge 230 is insertable in an axial direction (as shown by arrow 1) within sump housing 256 between a first position, wherein the O-rings are sealed but the downstream valve(s) are not open and water is not permitted to flow, and a second alignment position (FIG. 34). As further shown in FIG. 28, manifold 250 includes a correspondingly "keyed" correlated magnet 254 positioned for alignment with filter magnet 240 when filter housing 270 is inserted fully into sump 256, i.e., in the second alignment position, as shown in FIG. 34. Manifold magnet 254 is non-rotatable but is translatable linearly in a direction normal to the longitudinal axis of the filter cartridge. Manifold magnet 254 is operably coupled with switch assembly 260 via magnet holder 258, which is normally biased in the closed position by a spring 262 (FIG. 29). Switch assembly 260 is disposed within mounting bracket 266 and comprises magnet 254, spring 262 and actuator 264 for limit switch 268. In an embodiment, spring assembly 260 may be identical or substantially similar to spring assembly 60 as shown in FIGS. 10-11. When filter magnet 240 and manifold magnet 254 are in alignment and brought into an effective working distance, the result is a repulsion force between the two magnets. The force curves of the spring and magnet couple 240, 254 are engineered such that at peak efficacy, there is sufficient magnetic repulsion force to overcome the spring 262 force of the switch, compressing the spring in the direction of the arrow, as shown in FIG. 29. When the spring is fully depressed, holder 258 contacts actuator 264 to activate limit switch 260, which in turn actuates a valve (not shown), allowing for the flow of water.

Figure 30:
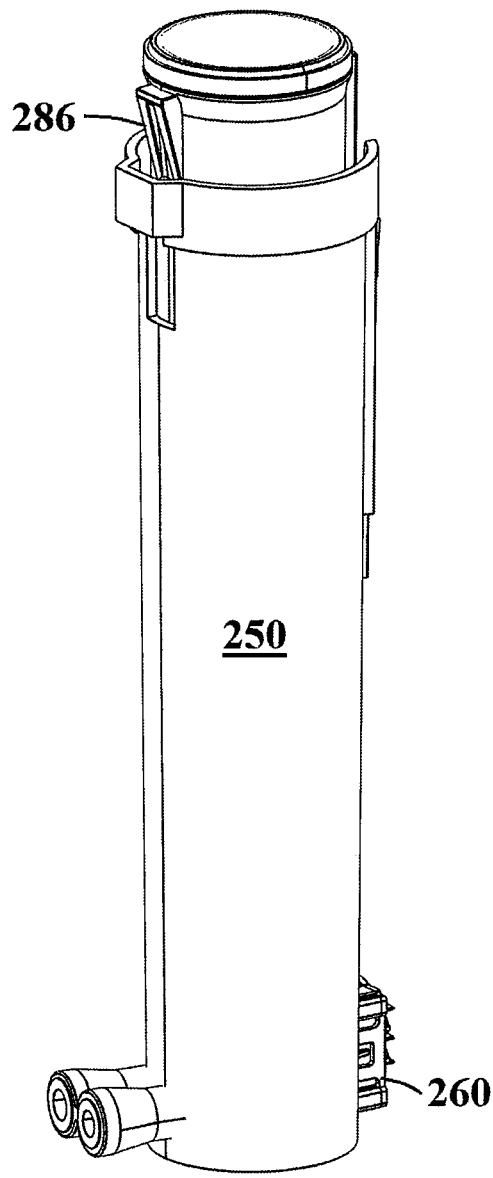
FIG. 30 depicts a perspective view of the filter interconnect of FIGS. 28-29.
Figure 31:
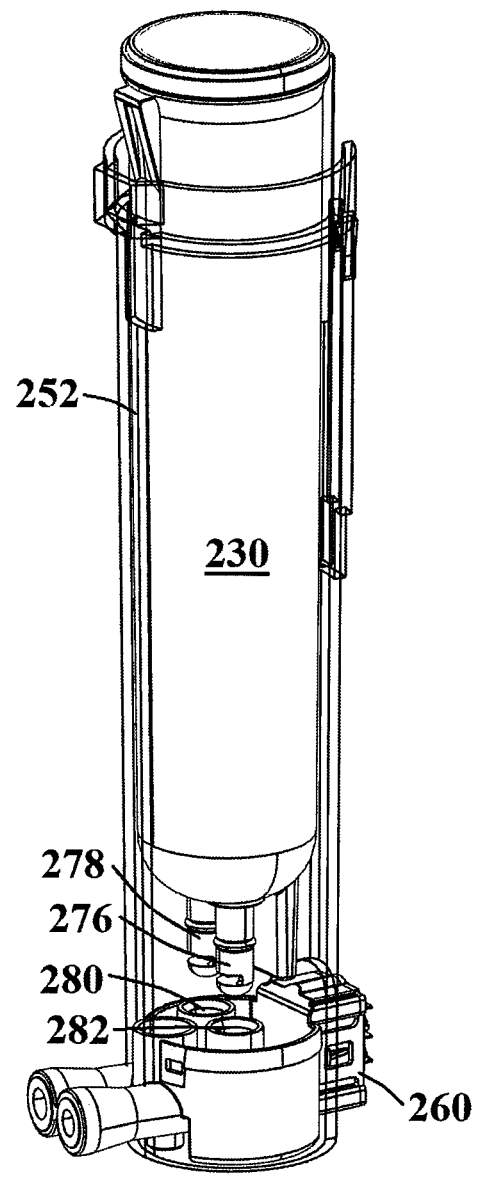
FIG. 31 depicts a perspective view of the filter interconnect of FIG. 30, with the filter manifold being partially transparent to show the interconnection between the filter cartridge ingress and egress ports and the ingress and egress stanchions of the filter manifold.
Figure 32:
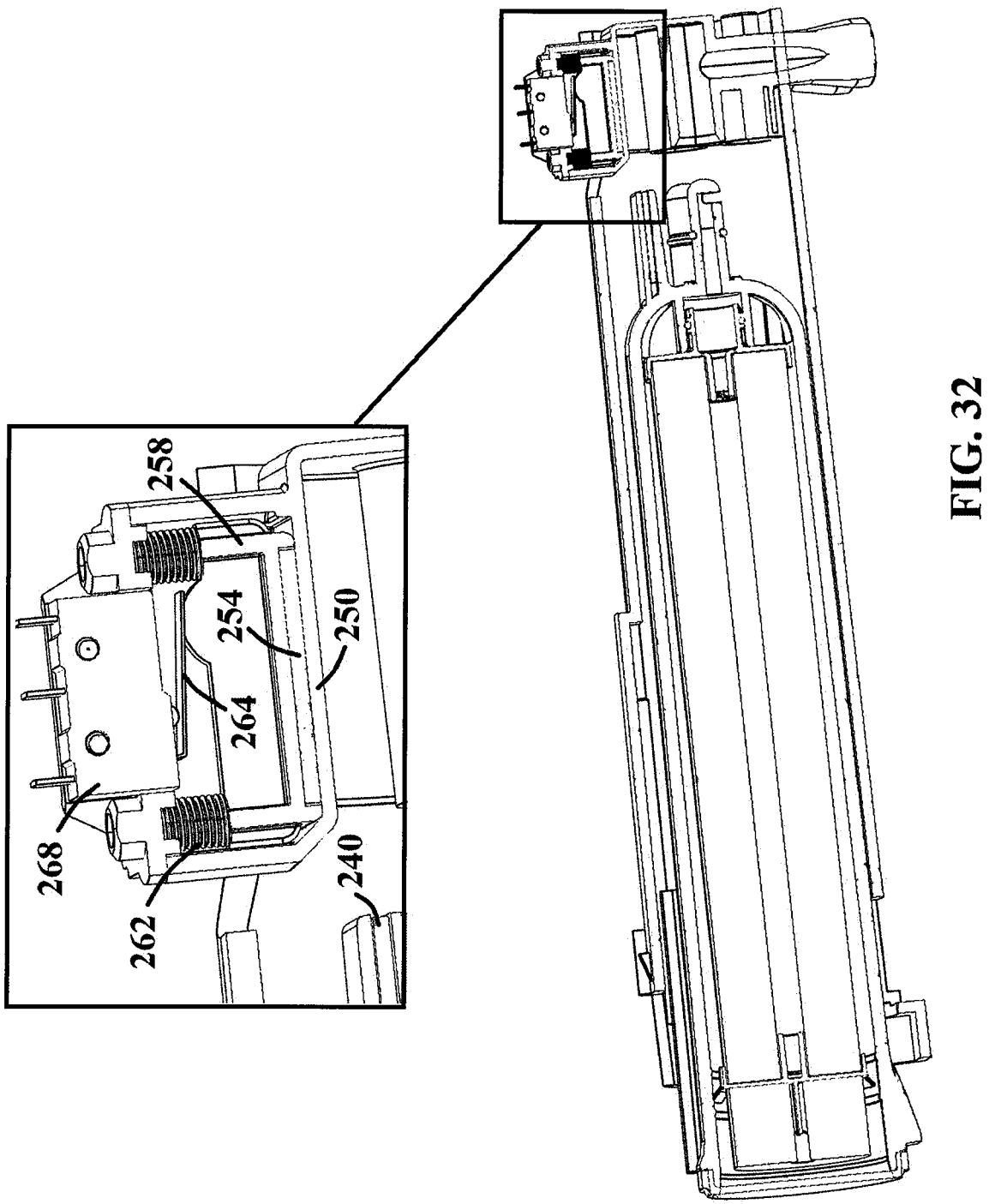
FIG. 32 depicts a perspective, cross-sectional view of the filter interconnect of FIG. 28, taken along line C-C.
Figure 33:
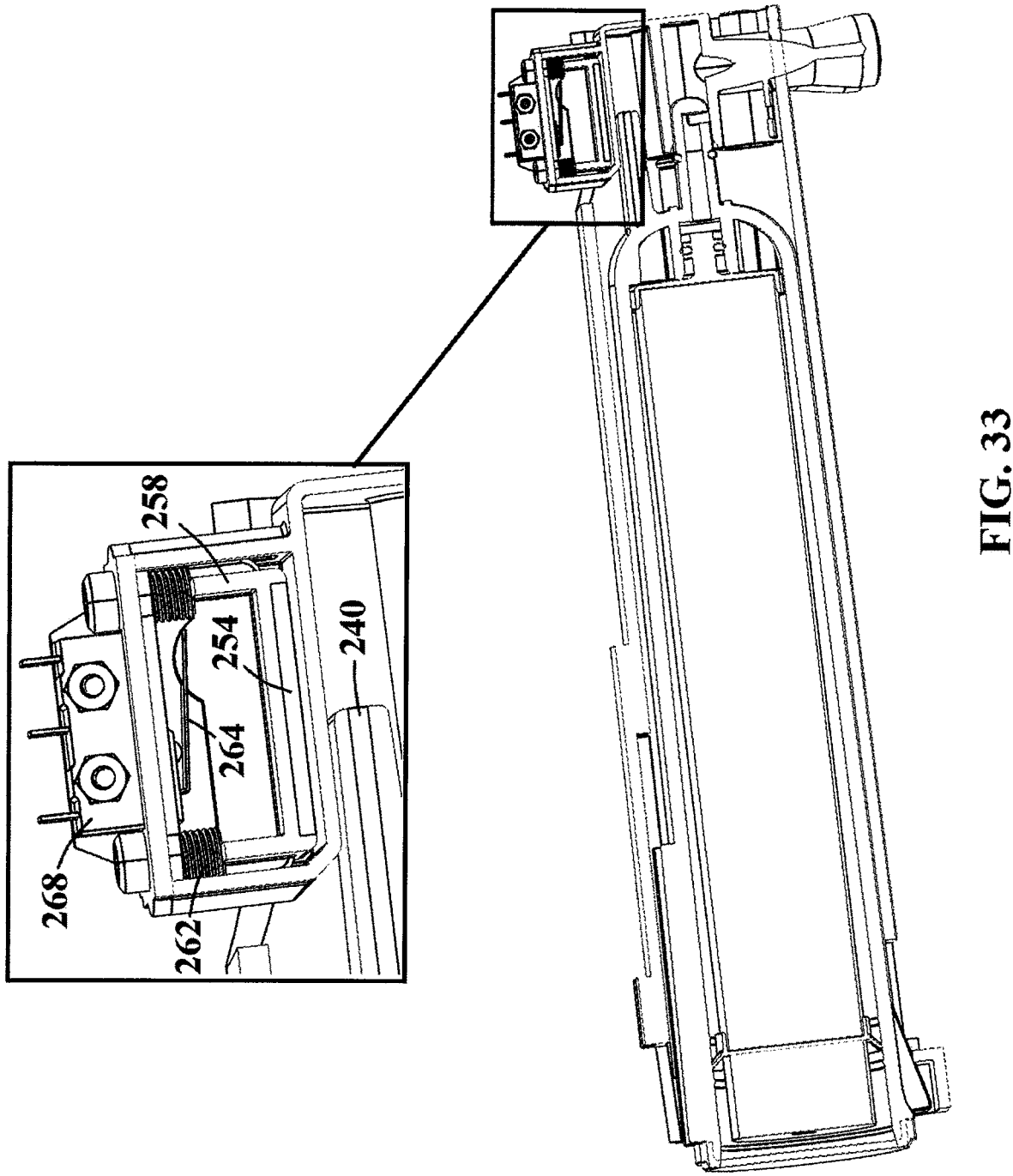
FIG. 33 depicts a perspective, cross-sectional view of the filter interconnect of FIG. 28, taken along line C-C, showing the filter cartridge being partially inserted into the filter manifold.

In one or more embodiments, manifold 250 may include an alignment channel for receiving at least a portion of filter cartridge 230 therein, to ensure that filter cartridge 230 is axially inserted into the sump 256 to allow for proper alignment of the filter and manifold magnets when in the alignment position. As shown in FIGS. 30-31, filter cartridge 230 includes a radially-extending rib or fin 286 on the housing body 272 which aligns with channel 252 in manifold 250 when filter cartridge 230 is properly inserted in sump 256. As best seen in FIGS. 32-34, when the filter cartridge is in the alignment position, disposed between the magnets is a portion of manifold 250, which prevents contact between magnets 240, 254 while still allowing for magnetic cooperation.

In addition to providing the initial drive to engage downstream system functionality, the magnetic communication between the filter and manifold magnets 240, 254 has the added benefit of providing filter authentication and anti-counterfeiting measures. Unless the polarity arrays or patterns of the correlated magnets are correspondingly "keyed", the magnetic communication will not actuate the switch 260 and therefore the valve will not open to allow for water flow. As such, only a genuine OEM filter cartridge will function and a non-OEM or counterfeit filter cartridge will be non-operational.

It should be understood by those skilled in the art that the present invention is not limited to magnetic communication between the filter cartridge correlated magnet and the corresponding manifold correlated magnet in the form of magnetic repulsion, and that other magnetic communication is not precluded. For example, in one or more embodiments, a shear force could be introduced as the filter cartridge is installed in the manifold, such that the manifold magnet is caused to move in a radial, or alternatively, lateral direction with respect to the filter cartridge magnet as the filter cartridge is moved into the INSTALLED-LOCKED position. Such radial or lateral movement could also activate a limit switch to open a valve, as in the embodiments shown in the Figures.

In such an embodiment, each of the filter and manifold magnets comprises at least one correlated magnet (or an array of correlated magnets), where the polarity transitions of each of the magnets are aligned such that a net shear force is generated between the magnets when the filter cartridge is inserted within the manifold sump housing and moved into an alignment position, allowing for direct or indirect actuation of downstream system functionality via mechanical actuation of simple machines.

Thus, the present invention achieves one or more of the following advantages. The present invention provides an improved filter interconnect which utilizes correlated magnetism to provide the initial drive to engage downstream system functionality, allowing for a higher degree of control and flexibility over the timing and actuation of downstream system function. By utilizing magnetic repulsion, the present invention further allows for non-electronic and non-contacting actuation of a downstream electronic system, which overcomes the technical hurdles of using electronic interconnects of the prior art which present issues of fluid reaching the electronic components, and provides an improved filter interconnect which prevents leaking by dissociating the initial filter cartridge installation from the actuation of an upstream and/or downstream valve. The present invention further has applications in alternate methods of filter authentication and anti-counterfeiting.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filtration system comprising:
   a filter manifold including:
      a sump;
      an electronic switch assembly comprising a circuit actuable between open and closed positions, the switch assembly axially disposed with respect to the sump; and
      a first correlated magnet operably coupled to the switch assembly, the first correlated magnet comprising a plurality of magnetic field emission sources having positions and polarities relating to a predefined spatial force function that corresponds to a predetermined alignment of the plurality of magnetic field emission sources; and
   a filter cartridge including:
      a housing having a body;
      a filter media disposed with the housing body;
      a filter head forming a fluid-tight seal with the body; and
      a complementary or paired second correlated magnet disposed within or connected to the filter head and having a face oriented parallel to a top surface thereof, the second correlated magnet rotatable with the filter cartridge;
   wherein the first and second correlated magnets are interconnected via magnetic communication upon insertion of the filter cartridge into the sump housing, and upon rotation of the filter cartridge into an alignment position, the first correlated magnet translates axially with respect to a longitudinal axis of the sump as a result of the magnetic communication to contact an actuator to activate the switch.

2. The filtration system of claim 1 wherein the first and second correlated magnets each comprise an array of correlated magnets.

3. The filtration system of claim 1 wherein the first correlated magnet plurality of magnetic field emission sources are aligned with a plurality of magnetic field emission sources of the second correlated magnet, such that a repulsion force is generated between the magnets when the filter cartridge is inserted within the sump and rotated to the alignment position.

4. The filtration system of claim 1 wherein the sump includes an alignment thread or channel for mechanically coupling with a filter boss or lug extending radially outwards from the filter cartridge housing body when the filter cartridge is inserted within the sump and rotated to the alignment position.

5. The filtration system of claim 4 wherein the filter cartridge rotates approximately 90-degrees in a first direction from an initial insertion position within the sump to the alignment position.

6. The filtration system of claim 1 wherein the manifold further includes a valve, and wherein activation of the switch actuates the valve to turn on and turn off fluid flow to the filter cartridge.

7. The filtration system of claim 1 wherein the filter cartridge further includes an axial stem and the second correlated magnet is disposed within the axial stem, parallel to the top surface of the filter head.

8. The filtration system of claim 1 wherein the first correlated magnet is disposed within a translatable magnet holder of the switch assembly, the magnet holder normally biased towards the filter head by a spring and slidable axially along the longitudinal axis of the sump as a result of the magnetic communication to contact the actuator to activate the switch upon rotation of the filter cartridge into an alignment position.

9. A filter cartridge, comprising:
a housing having a body;
a filter media disposed within the housing body;
a filter head forming a fluid-tight seal with the body;
an axial stem extending from a top surface of the filter head and comprising fluid ingress and egress ports in fluid communication with the filter media; and
a first correlated magnet disposed within or connected to the axial stem and having a face oriented parallel to a top surface thereof, the first correlated magnet rotatable with the filter cartridge upon insertion into a sump of a filter manifold, the first correlated magnet comprising a plurality of magnetic field emission sources having positions and polarities relating to a predefined spatial force function that corresponds to a predetermined alignment of the plurality of magnetic field emission sources.

10. The filter cartridge of claim 9 further including a filter boss or lug extending radially from the housing body, the filter boss or lug adapted for mechanically coupling with an alignment thread or channel of the sump.

11. The filter cartridge of claim 10 wherein the filter cartridge rotates approximately 90-degrees in a first direction from an initial insertion position within the sump to the alignment position.

12. The filter cartridge of claim 9 wherein the first correlated magnet comprises an array of correlated magnets each comprising a plurality of magnetic field emission sources, the array of correlated magnets arranged in accordance with the predefined spatial force function that corresponds to the predetermined alignment of the plurality of magnetic field emission sources.

13. A method of interconnecting a filter cartridge and filter manifold, comprising:
inserting the filter cartridge into a sump of the filter manifold, the filter cartridge comprising a housing having a body, a filter media disposed within the housing body, a filter head forming a fluid-tight seal with the body, and a first correlated magnet disposed within or connected to the filter head and having a face oriented parallel to a top surface thereof, the first correlated magnet being rotatable with the filter cartridge, the first correlated magnet comprising a plurality of magnetic field emission sources having positions and polarities relating to a predefined spatial force function that corresponds to a predetermined alignment of the plurality of magnetic field emission sources;
rotating the filter cartridge within the sump into an alignment position;
aligning the first correlated magnet plurality of magnetic field emission sources with a plurality of magnetic field emission sources of a complementary or paired second correlated magnet such that a repulsion force is generated between the magnets, the second correlated magnet operably coupled to a switch assembly axially disposed with respect to the sump; and
causing the second correlated magnet to translate axially with respect to a longitudinal axis of the sump as a result of magnetic repulsion to contact an actuator to activate the switch.

14. The method of claim 13 wherein the sump includes an alignment thread or channel for mechanically coupling with a filter boss or lug extending radially outwards from the filter cartridge housing body, and further comprising the steps of:
aligning the filter boss or lug with the alignment thread or channel while inserting the filter cartridge within the sump; and
causing the filter boss or lug to travel to an end of the alignment thread or channel while rotating the filter cartridge to the alignment position.

15. The method of claim 14 wherein the filter cartridge rotates approximately 90-degrees in a first direction from an initial insertion position within the sump to the alignment position.

16. A filtration system comprising:
a filter manifold including:
a sump;
an electronic switch assembly comprising a circuit actuable between open and closed positions, the switch assembly radially disposed with respect to the sump; and
a first correlated magnet operably coupled to the switch assembly, the first correlated magnet comprising a plurality of magnetic field emission sources having positions and polarities relating to a predefined spatial force function that corresponds to a predetermined alignment of the plurality of magnetic field emission sources; and
a filter cartridge including:
a housing having a body and a top portion forming a fluid-tight seal with the body, the top portion including:
ingress and egress fluid ports; and
an axially-extending protrusion integral with or connected to the housing top portion;
a filter media disposed with the housing body; and
a complementary or paired second correlated magnet disposed within or connected to the housing top portion axially-extending protrusion and having a face oriented parallel to a longitudinal axis of the housing body;
wherein the first and second correlated magnets are interconnected via magnetic communication upon axial insertion of the filter cartridge into an alignment position within the sump, and upon movement of the filter cartridge into the alignment position, the first correlated magnet translates in a direction normal to a longitudinal axis of the sump as a result of the magnetic communication to contact an actuator to activate the switch.

17. The filtration system of claim 16 wherein the first and second correlated magnets each comprise an array of correlated magnets.

18. The filtration system of claim 16 wherein the first correlated magnet plurality of magnetic field emission sources are aligned with a plurality of magnetic field emission sources of the second correlated magnet, such that a repulsion force is generated between the magnets when the filter cartridge is axially inserted within the sump and moved to the alignment position.

19. The filtration system of claim 16 wherein the sump includes an alignment thread or channel for mechanically coupling with a rib or fin extending radially outwards from the filter cartridge housing body when the filter cartridge is axially inserted within the sump.

20. The filtration system of claim 16 wherein the manifold further includes a valve, and wherein activation of the switch actuates the valve to turn on and turn off fluid flow to the filter cartridge.

21. The filtration system of claim 16 wherein the first correlated magnet is disposed within a translatable magnet housing of the switch assembly, the magnet housing normally biased towards the longitudinal axis of the sump by a spring and slidable linearly as a result of the magnetic communication in a direction normal to the longitudinal axis of the sump to contact the actuator to activate the switch.

22. A filter cartridge, comprising:
  a housing having a body and a top portion forming a fluid-tight seal with the body, the top portion including:
    ingress and egress fluid ports extending axially upward from the top portion, the ingress and egress fluid ports radially offset from a center axis of the housing body; and
    an axially-extending protrusion integral with or connected to the housing top portion;
  a filter media disposed with the housing body; and
  a first correlated magnet disposed within or connected to the housing top portion axially-extending protrusion and having a face oriented parallel to a longitudinal axis of the housing body, the first correlated magnet comprising a plurality of magnetic field emission sources having positions and polarities relating to a predefined spatial force function that corresponds to a predetermined alignment of the plurality of magnetic field emission sources.

23. The filter cartridge of claim 22 further including a rib or fin extending radially outwards from the housing body, the rib or fin adapted for mechanically coupling with an alignment thread or channel of a sump of a mating filter manifold when the filter cartridge is axially inserted within the sump.

24. A method of interconnecting a filter cartridge and filter manifold, comprising:
  inserting the filter cartridge into a sump of the filter manifold, the filter cartridge comprising a housing having a body and a top portion forming a fluid-tight seal with the body, the top portion including ingress and egress fluid ports, and an axially-extending protrusion integral with or connected to the housing top portion, a filter media disposed with the housing body, and a first correlated magnet disposed within or connected to the housing top portion axially-extending protrusion and having a face oriented parallel to a longitudinal axis of the housing body, the first correlated magnet comprising a plurality of magnetic field emission sources having positions and polarities relating to a predefined spatial force function that corresponds to a predetermined alignment of the plurality of magnetic field emission sources;
  axially inserting the filter cartridge within the sump into an alignment position;
  aligning the first correlated magnet plurality of magnetic field emission sources with a plurality of magnetic field emission sources of a complementary or paired second correlated magnet such that a repulsion force is generated between the magnets, the second correlated magnet operably coupled to a switch assembly axially disposed with respect to the sump; and
  causing the second correlated magnet to translate in a direction normal to a longitudinal axis of the sump as a result of the magnetic communication to contact an actuator to activate the switch.

25. The method of claim 24 wherein the sump includes an alignment thread or channel for mechanically coupling with a rib or fin extending radially outwards from the filter cartridge housing body, and further comprising the steps of:
  aligning the filter cartridge rib or fin with the alignment thread or channel while inserting the filter cartridge within the sump; and
  causing the filter cartridge rib or fin to travel to an end of the alignment thread or channel while axially inserting the filter cartridge to the alignment position.

26. A filtration system comprising:
  a filter manifold including:
    a sump;
    an electronic switch assembly comprising a circuit actuable between open and closed positions, the switch assembly axially disposed with respect to the sump; and
    a first correlated magnet operably coupled to the switch assembly, the first correlated magnet comprising a plurality of magnetic field emission sources having positions and polarities relating to a predefined spatial force function that corresponds to a predetermined alignment of the plurality of magnetic field emission sources; and
  a filter cartridge including:
    a housing having a body;
    a filter media disposed with the housing body;
    a filter head forming a fluid-tight seal with the body; and
    a complementary or paired second correlated magnet disposed within or connected to the filter head and having a face oriented parallel to a top surface thereof;
  wherein the first correlated magnet plurality of magnetic field emission sources are aligned with a plurality of magnetic field emission sources of the second correlated magnet such that a repulsion force is generated between the magnets when the filter cartridge is inserted within the sump and translated axially to an alignment position, and upon axial movement of the filter cartridge into the alignment position, the first correlated magnet translates axially with respect to a longitudinal axis of the sump as a result of the magnetic repulsion to contact an actuator to activate the switch.

27. The filtration system of claim 26 wherein the plurality of magnetic field emission sources of each of the first and second correlated magnets are arranged concentrically so as to generate the magnetic repulsion when in the alignment position.

28. A filter cartridge, comprising:
  a housing having a body;
  a filter media disposed within the housing body;
  a filter head forming a fluid-tight seal with the body;
  an axial stem extending outwardly from a top surface of the filter head and comprising fluid ingress and egress ports in fluid communication with the filter media; and
  a coded polymagnet disposed within or connected to the axial stem and having a face oriented parallel to a top surface thereof, the coded polymagnet comprising a plurality of magnetic field emission sources having positions and polarities relating to a predefined spatial force function that corresponds to a predetermined alignment of the plurality of magnetic field emission sources.

* * * * *